United States Patent
Nam et al.

(10) Patent No.: US 12,028,741 B2
(45) Date of Patent: Jul. 2, 2024

(54) DYNAMIC CONTROL CHANNEL MANAGEMENT

(71) Applicant: QUALCOMM Incorporated, San Diego, CA (US)

(72) Inventors: Wooseok Nam, San Diego, CA (US); Tao Luo, San Diego, CA (US); Junyi Li, Chester, NJ (US); Juergen Cezanne, Ocean Township, NJ (US); Muhammad Nazmul Islam, Littleton, MA (US); Vasanthan Raghavan, West Windsor Township, NJ (US)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

(21) Appl. No.: 16/404,595

(22) Filed: May 6, 2019

(65) Prior Publication Data

US 2019/0349806 A1    Nov. 14, 2019

Related U.S. Application Data

(60) Provisional application No. 62/669,814, filed on May 10, 2018.

(51) Int. Cl.
*H04W 24/10* (2009.01)
*H04L 5/00* (2006.01)
*H04W 28/02* (2009.01)

(52) U.S. Cl.
CPC ....... *H04W 28/0278* (2013.01); *H04L 5/0055* (2013.01); *H04W 24/10* (2013.01); *H04W 28/0263* (2013.01)

(58) Field of Classification Search
CPC ... H04L 5/0007; H04L 5/0053; H04L 5/0094; H04L 5/0055; H04W 48/12;

(Continued)

(56) References Cited

U.S. PATENT DOCUMENTS 8,102,877 B1 * 1/2012 Liu ................. H04L 47/805
                                                  370/468
9,386,576 B2    7/2016 Chen et al.
(Continued)

FOREIGN PATENT DOCUMENTS

CN    104038329 A    9/2014
CN    104937865 A    9/2015
(Continued)

OTHER PUBLICATIONS

InterDigital Communications, Downlink Control Channel Framework, R1-1700704, Jan. 2017, 3GPP (Year: 2017).*

(Continued)

Primary Examiner — Harun Chowdhury
(74) Attorney, Agent, or Firm — Holland & Hart LLP

(57) ABSTRACT

Methods, systems, and devices for wireless communications are described. A user equipment (UE) may receive a first signal from a base station indicating a set of available control channel monitoring sets to be used for control information. The UE may receive, over a default control channel monitoring set of the available control channel monitoring sets configured for the UE, a second signal from the base station activating at least one additional control channel monitoring set from the set of available control channel monitoring sets, the default control channel monitoring set comprising a subset of the set of available control channel monitoring sets. The UE may receive control information over the default control channel monitoring set and the at least one additional control channel monitoring set at least partially in response to receiving the second signal.

26 Claims, 16 Drawing Sheets

(58) Field of Classification Search
CPC ........... H04W 72/042; H04W 72/1289; H04W 74/0833; H04W 24/10; H04W 28/0278
USPC .................................. 370/252, 254, 328, 329
See application file for complete search history.

(56) References Cited

U.S. PATENT DOCUMENTS

| | | |
|---|---|---|
| 2010/0254268 A1 | 10/2010 | Kim et al. |
| 2016/0255611 A1 | 9/2016 | Damnjanovic et al. |
| 2016/0345311 A1 | 11/2016 | Chen et al. |
| 2017/0048727 A1* | 2/2017 | Cho .................. H04W 74/0833 |
| 2017/0264417 A1* | 9/2017 | Eriksson ............. H04W 72/042 |
| 2018/0191454 A1 | 7/2018 | Furuskog et al. |
| 2018/0255452 A1* | 9/2018 | Wu ........................ H04W 36/08 |
| 2019/0305867 A1* | 10/2019 | Tseng .................. H04W 72/042 |
| 2020/0067685 A1* | 2/2020 | Awad ..................... H04L 5/0053 |
| 2020/0077343 A1* | 3/2020 | Yeo ........................ H04L 5/0094 |
| 2020/0128585 A1* | 4/2020 | Kuang .................. H04L 5/0053 |
| 2020/0187236 A1* | 6/2020 | Moon ................... H04L 5/0094 |
| 2020/0296795 A1* | 9/2020 | Uchiyama ................ H04L 1/08 |
| 2020/0367253 A1* | 11/2020 | Kim .................... H04W 72/042 |

FOREIGN PATENT DOCUMENTS

| | | |
|---|---|---|
| EP | 2501057 A1 | 9/2012 |
| EP | 3461221 A1 | 3/2019 |
| GB | 2560770 A | 9/2018 |
| WO | WO-2014077996 | 5/2014 |
| WO | WO-2016190970 | 12/2016 |
| WO | WO-2019185027 A1 | 10/2019 |

OTHER PUBLICATIONS

International Search Report and Written Opinion—PCT/US2019/031145—ISA/EPO—dated Jul. 31, 2019.
Interdigital Communications: "DL Control Channel Common Search Space", 3GPP Draft; R1-1700705, 3rd Generation Partnership Project (3GPP), Mobile Competence Centre; 650, Route Des Lucioles; F-06921 Sophia-Antipolis Cedex; France, vol. RAN WG1, No. Spokane, USA; Jan. 16, 2017-Jan. 20, 2017, Jan. 10, 2017 (Jan. 10, 2017), XP051203024, 2 pages, Retrieved from the Internet: URL: http://www.3gpp.org/ftp/tsg_ran/WG1_RL1/TSGR1_AH/NR_AH_1701/Docs/ [retrieved on Jan. 10, 2017], Section 1-3.
Interdigital Inc: "Control Channels Monitoring with Multiple CORESETs", 3GPP Draft; R1-1709016, 3rd Generation Partnership Project (3GPP), Mobile Competence Centre, 650, Route Des Lucioles ; F-06921 Sophia-Antipolis Cedex, France, vol. RAN WG1, No. Hangzhou; May 15, 2017-May 19, 2017, May 14, 2017 (May 14, 2017), pp. 1-3, XP051274178, Retrieved from the Internet: URL: http://www.3gpp.org/ftp/Meetings_3GPP_SYNC/RAN1/Docs/ [retrieved on May 14, 2017], Section 1-3.
ETRI: "Discussion on Control Resource Set and DMRS for DL Control Channel", 3GPP TSG RAN WG1 NR Ad-Hoc Meeting, R1-1700581, vol. RAN WG1, No. Spokane, USA, Jan. 16, 2017-Jan. 20, 2017, Jan. 16, 2017 (Jan. 16, 2017), XP051208110, pp. 1-5.
Qualcomm Incorporated: "Physical Data Channels and Associated Physical Control Channels", 3GPP TSG RAN WG1 #78bis, R1-143995, Ljubljana, Slovenia Oct. 6-10, 2014, pp. 1-3.

\* cited by examiner

Active Control Channel Monitoring Set 220

Inactive Control Channel Monitoring Set 225

DYNAMIC CONTROL CHANNEL MANAGEMENT

CROSS REFERENCES

The present Application for Patent claims the benefit of U.S. Provisional Patent Application No. 62/669,814 by NAM, et al., entitled "DYNAMIC CONTROL CHANNEL MANAGEMENT," filed May 10, 2018, assigned to the assignee hereof, and expressly incorporated herein.

BACKGROUND

The following relates generally to wireless communications, and more specifically to dynamic control channel management.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

Wireless communication systems are typically configured to communicate various control information between devices. For example, control information may be sent in control symbols according to a control resource set (coreset) configuration that includes a set of physical resource blocks (PRBs) that are transmitted over a number of OFDM symbols. Such configurations provide frequency diversity by spreading the control information (e.g., physical downlink control channel (PDCCH) information) over the coreset. Conventionally, the control information is communicated using a number of control resources at the beginning of a slot (or mini-slot), such as using the first three symbols (or control symbols) of the slot (or mini-slot).

Some wireless communications systems, such as an NR network, millimeter wave (mmW) network, and the like, may support various power efficient operations. For example, such networks may be configuration-based where the bandwidth, number of component carriers, number of coreset(s), search space periodicity, and the like, can be changed using various configuration signaling. Although efficient in terms of power saving, such configuration operations may involve radio frequency (RF) switching, signaling latency, and the like, which may be unsuitable in some environments, e.g., such as an environment experiencing dynamic or bursty changes in traffic conditions.

SUMMARY

The described techniques relate to improved methods, systems, devices, and apparatuses that support dynamic control channel management. Generally, the described techniques provide a mechanism to support a user equipment's (UE's) power saving operations by the base station dynamically changing and indicating the number of control channel monitoring set (e.g., comprising control resource set (coreset)(s), search space (SS) set(s), component carrier(s) (CC)(s), and the like) that a UE can monitor for control information. For example, the base station may transmit a signal to the UE (e.g., a first signal) that configures a set of available control channel monitoring sets for the UE. In some aspects, at least one control channel monitoring set from the available control channel monitoring sets may be configured as the default control channel monitoring set for the UE to monitor. In response to various triggering conditions, the base station may transmit a second signal to the UE that activates additional control channel monitoring set(s) for the UE. In some aspects, the additional control channel monitoring set(s) may be for the current CC (e.g., the primary CC (PCC)) and/or for one or more secondary CCs (SCCs). In some aspects, the base station may dynamically activate/deactivate the additional control channel monitoring set(s) using a downlink control information (DCI) in the default control channel monitoring set configured for the UE. The UE may monitor the default control channel monitoring set and any additional control channel monitoring set(s) that have been activated to receive control information. In some aspects, the base station may use the default and any additional control channel monitoring set(s) to communicate control information to the UE, e.g., to schedule additional resources to support communicating the bursty traffic. In some aspects, the additional control channel monitoring set(s) may be deactivated based on a timer, whether or not control information is communicated over the additional control channel monitoring set(s), based on explicit signaling, based on implicit signaling, and the like. Accordingly, the UE may be configured with the available control channel monitoring sets, whereas the UE only monitors the default control channel monitoring set until additional control channel monitoring set(s) are activated by the base station.

A method of wireless communication at a UE is described. The method may include receiving a first signal from a base station indicating a set of available control channel monitoring sets to be used for control information, receiving, over a default control channel monitoring set of the available control channel monitoring sets configured for the UE, a second signal from the base station activating at least one additional control channel monitoring set from the set of available control channel monitoring sets, the default control channel monitoring set including a subset of the set of available control channel monitoring sets, and receiving control information over the default control channel monitoring set and the at least one additional control channel monitoring set at least partially in response to receiving the second signal.

An apparatus for wireless communication at a UE is described. The apparatus may include a processor, memory in electronic communication with the processor, and instructions stored in the memory. The instructions may be executable by the processor to cause the apparatus to receive a first signal from a base station indicating a set of available control channel monitoring sets to be used for control information, receive, over a default control channel monitoring set of the available control channel monitoring sets configured for the UE, a second signal from the base station activating at least one additional control channel monitoring set from the set of available control channel monitoring sets, the default control channel monitoring set including a subset of the set of available control channel monitoring sets, and receive control information over the default control channel monitoring set and the at least one additional control channel monitoring set at least partially in response to receiving the second signal.

Another apparatus for wireless communication at a UE is described. The apparatus may include means for receiving a first signal from a base station indicating a set of available control channel monitoring sets to be used for control information, receiving, over a default control channel monitoring set of the available control channel monitoring sets configured for the UE, a second signal from the base station activating at least one additional control channel monitoring set from the set of available control channel monitoring sets, the default control channel monitoring set including a subset of the set of available control channel monitoring sets, and receiving control information over the default control channel monitoring set and the at least one additional control channel monitoring set at least partially in response to receiving the second signal.

A non-transitory computer-readable medium storing code for wireless communication at a UE is described. The code may include instructions executable by a processor to receive a first signal from a base station indicating a set of available control channel monitoring sets to be used for control information, receive, over a default control channel monitoring set of the available control channel monitoring sets configured for the UE, a second signal from the base station activating at least one additional control channel monitoring set from the set of available control channel monitoring sets, the default control channel monitoring set including a subset of the set of available control channel monitoring sets, and receive control information over the default control channel monitoring set and the at least one additional control channel monitoring set at least partially in response to receiving the second signal.

Some examples of the method, apparatuses, and non-transitory computer-readable medium described herein may further include operations, features, means, or instructions for transmitting a request signal to the base station for activation of the at least one additional control channel monitoring set, where the second signal may be received based on the request signal.

Some examples of the method, apparatuses, and non-transitory computer-readable medium described herein may further include operations, features, means, or instructions for transmitting a predetermined number of negative acknowledgment (NACK) signals to the base station, where the request signal includes the predetermined number of NACK signals.

Some examples of the method, apparatuses, and non-transitory computer-readable medium described herein may further include operations, features, means, or instructions for determining that a traffic condition associated with communications with the base station may have satisfied a threshold, where the request signal may be transmitted in response to the traffic condition satisfying the threshold.

In some examples of the method, apparatuses, and non-transitory computer-readable medium described herein, the traffic condition includes at least one of a predetermined amount of data for communicating with the base station, or a traffic load condition, or an available transmit power condition, or a UE thermal condition, or a combination thereof.

In some examples of the method, apparatuses, and non-transitory computer-readable medium described herein, the request signal includes a buffer status report (BSR) indicating that a buffer of the UE may have a predetermined amount of data for communicating with the base station.

In some examples of the method, apparatuses, and non-transitory computer-readable medium described herein, the request signal includes a request to activate a second component carrier for the UE.

In some examples of the method, apparatuses, and non-transitory computer-readable medium described herein, the request signal includes a scheduling request transmitted on a second component carrier, the second component carrier being different from a first component carrier associated with the default control channel monitoring set configured for the UE.

In some examples of the method, apparatuses, and non-transitory computer-readable medium described herein, the request signal may be transmitted in an uplink control information (UCI).

In some examples of the method, apparatuses, and non-transitory computer-readable medium described herein, the request signal may be transmitted in at least one of a medium access control (MAC) control element (CE), or a physical uplink control channel (PUCCH), or a combination thereof.

Some examples of the method, apparatuses, and non-transitory computer-readable medium described herein may further include operations, features, means, or instructions for initiating, based on the second signal, a timer for the at least one additional control channel monitoring set.

Some examples of the method, apparatuses, and non-transitory computer-readable medium described herein may further include operations, features, means, or instructions for stopping the timer after a predetermined time period.

Some examples of the method, apparatuses, and non-transitory computer-readable medium described herein may further include operations, features, means, or instructions for stopping the timer after a predetermined number of slots in which no control information may be received in the at least one additional control channel monitoring set.

Some examples of the method, apparatuses, and non-transitory computer-readable medium described herein may further include operations, features, means, or instructions for restarting the timer based on receiving the control information over the at least one additional control channel monitoring set.

In some examples of the method, apparatuses, and non-transitory computer-readable medium described herein, the second signal activates a set of additional control channel monitoring sets, and a separate timer may be initiated for each of the set of additional control channel monitoring sets.

Some examples of the method, apparatuses, and non-transitory computer-readable medium described herein may further include operations, features, means, or instructions for receiving an activation signal activating a second component carrier for the UE, where the second signal includes the activation signal.

Some examples of the method, apparatuses, and non-transitory computer-readable medium described herein may further include operations, features, means, or instructions for receiving an activation signal activating a secondary cell to use for communications with the UE, where the second signal includes the activation signal.

Some examples of the method, apparatuses, and non-transitory computer-readable medium described herein may further include operations, features, means, or instructions for receiving a third signal indicating that a traffic condition satisfies a threshold, where the second signal includes the third signal. Some examples of the method, apparatuses, and non-transitory computer-readable medium described herein may further include operations, features, means, or instructions for transmitting a positive acknowledgement signal to the base station based at least in part on the second signal, the third signal, or a combination thereof.

Some examples of the method, apparatuses, and non-transitory computer-readable medium described herein may further include operations, features, means, or instructions for receiving a third signal indicating that the at least one additional control channel monitoring set may be deactivated for the UE, where a deactivation indication may be received over a DCI in the default control channel monitoring set configured for the UE and refraining from monitoring the at least one additional control channel monitoring set based on the third signal. Some examples of the method, apparatuses, and non-transitory computer-readable medium described herein may further include operations, features, means, or instructions for transmitting a positive acknowledgement signal to the base station based at least in part on the second signal, the third signal, or a combination thereof.

Some examples of the method, apparatuses, and non-transitory computer-readable medium described herein may further include operations, features, means, or instructions for receiving a third signal indicating that a second component carrier may have been deactivated for the UE. Some examples of the method, apparatuses, and non-transitory computer-readable medium described herein may further include operations, features, means, or instructions for transmitting a positive acknowledgement signal to the base station based at least in part on the second signal, the third signal, or a combination thereof.

In some examples of the method, apparatuses, and non-transitory computer-readable medium described herein, the second signal may be received over a DCI, the DCI indicating an index for the at least one additional control channel monitoring set.

In some examples of the method, apparatuses, and non-transitory computer-readable medium described herein, the second signal may be received over at least one of a MAC CE, or a PDCCH, or a combination thereof.

In some examples of the method, apparatuses, and non-transitory computer-readable medium described herein, the at least one additional control channel monitoring set may be associated with a primary component carrier, or a secondary component carrier, or a combination thereof.

Some examples of the method, apparatuses, and non-transitory computer-readable medium described herein may further include operations, features, means, or instructions for monitoring, in response to receiving the second signal, the default control channel monitoring set and the at least one additional control channel monitoring set, where the control information may be received in response to the monitoring.

In some examples of the method, apparatuses, and non-transitory computer-readable medium described herein, the control information received in the at least one additional control channel monitoring set includes a downlink grant for data in a corresponding data or shared data resource.

Some examples of the method, apparatuses, and non-transitory computer-readable medium described herein may further include operations, features, means, or instructions for transmitting a positive acknowledgement signal to the base station based at least in part on the second signal.

A method of wireless communication at a base station is described. The method may include transmitting a first signal to a UE indicating a set of available control channel monitoring sets to be used for control information, transmitting, over a default control channel monitoring set of the available control channel monitoring sets configured for the UE, a second signal from the base station activating at least one additional control channel monitoring set from the set of available control channel monitoring sets, the default control channel monitoring set including a subset of the set of available control channel monitoring sets, and transmitting control information over the default control channel monitoring set and the at least one additional control channel monitoring set at least partially in response to transmitting the second signal.

An apparatus for wireless communication at a base station is described. The apparatus may include a processor, memory in electronic communication with the processor, and instructions stored in the memory. The instructions may be executable by the processor to cause the apparatus to transmit a first signal to a UE indicating a set of available control channel monitoring sets to be used for control information, transmit, over a default control channel monitoring set of the available control channel monitoring sets configured for the UE, a second signal from the base station activating at least one additional control channel monitoring set from the set of available control channel monitoring sets, the default control channel monitoring set including a subset of the set of available control channel monitoring sets, and transmit control information over the default control channel monitoring set and the at least one additional control channel monitoring set at least partially in response to transmitting the second signal.

Another apparatus for wireless communication at a base station is described. The apparatus may include means for transmitting a first signal to a UE indicating a set of available control channel monitoring sets to be used for control information, transmitting, over a default control channel monitoring set of the available control channel monitoring sets configured for the UE, a second signal from the base station activating at least one additional control channel monitoring set from the set of available control channel monitoring sets, the default control channel monitoring set including a subset of the set of available control channel monitoring sets, and transmitting control information over the default control channel monitoring set and the at least one additional control channel monitoring set at least partially in response to transmitting the second signal.

A non-transitory computer-readable medium storing code for wireless communication at a base station is described. The code may include instructions executable by a processor to transmit a first signal to a UE indicating a set of available control channel monitoring sets to be used for control information, transmit, over a default control channel monitoring set of the available control channel monitoring sets configured for the UE, a second signal from the base station activating at least one additional control channel monitoring set from the set of available control channel monitoring sets, the default control channel monitoring set including a subset of the set of available control channel monitoring sets, and transmit control information over the default control channel monitoring set and the at least one additional control channel monitoring set at least partially in response to transmitting the second signal.

Some examples of the method, apparatuses, and non-transitory computer-readable medium described herein may further include operations, features, means, or instructions for receiving a request signal from the UE for activation of the at least one additional control channel monitoring set, where the second signal may be transmitted based on the request signal.

Some examples of the method, apparatuses, and non-transitory computer-readable medium described herein may further include operations, features, means, or instructions for receiving a predetermined number of NACK signals from the UE, where the request signal includes the predetermined number of NACK signals.

Some examples of the method, apparatuses, and non-transitory computer-readable medium described herein may further include operations, features, means, or instructions for determining that a traffic condition associated with communications with the UE may have satisfied a threshold, where the request signal may be received in response to the traffic condition satisfying the threshold.

In some examples of the method, apparatuses, and non-transitory computer-readable medium described herein, the traffic condition includes at least one of a predetermined amount of data for communicating with the UE, or a traffic load condition, or a combination thereof.

In some examples of the method, apparatuses, and non-transitory computer-readable medium described herein, the request signal includes a BSR indicating that a buffer of the UE may have a predetermined amount of data for communicating with the base station.

In some examples of the method, apparatuses, and non-transitory computer-readable medium described herein, the request signal includes a request to activate a second component carrier for the UE.

In some examples of the method, apparatuses, and non-transitory computer-readable medium described herein, the request signal includes a scheduling request transmitted on a second component carrier, the second component carrier being different from a first component carrier associated with the default control channel monitoring set configured for the UE.

In some examples of the method, apparatuses, and non-transitory computer-readable medium described herein, the request signal may be received in an UCI.

In some examples of the method, apparatuses, and non-transitory computer-readable medium described herein, the request signal may be received in at least one of a MAC CE, or a PUCCH, or a combination thereof.

Some examples of the method, apparatuses, and non-transitory computer-readable medium described herein may further include operations, features, means, or instructions for initiating, based on the second signal, a timer for the at least one additional control channel monitoring set.

Some examples of the method, apparatuses, and non-transitory computer-readable medium described herein may further include operations, features, means, or instructions for stopping the timer after a predetermined time period.

Some examples of the method, apparatuses, and non-transitory computer-readable medium described herein may further include operations, features, means, or instructions for stopping the timer after a predetermined number of slots in which no control information may be transmitted in the at least one additional control channel monitoring set.

Some examples of the method, apparatuses, and non-transitory computer-readable medium described herein may further include operations, features, means, or instructions for restarting the timer based on transmitting the control information over the at least one additional control channel monitoring set.

In some examples of the method, apparatuses, and non-transitory computer-readable medium described herein, the second signal activates a set of additional control channel monitoring sets, and a separate timer may be initiated for each of the set of additional control channel monitoring sets.

Some examples of the method, apparatuses, and non-transitory computer-readable medium described herein may further include operations, features, means, or instructions for transmitting an activation signal activating a second component carrier for the UE, where the second signal includes the activation signal.

Some examples of the method, apparatuses, and non-transitory computer-readable medium described herein may further include operations, features, means, or instructions for transmitting an activation signal activating a secondary cell to use for communications with the UE, where the second signal includes the activation signal.

Some examples of the method, apparatuses, and non-transitory computer-readable medium described herein may further include operations, features, means, or instructions for transmitting a third signal indicating that a traffic condition satisfies a threshold, where the second signal includes the third signal. Some examples of the method, apparatuses, and non-transitory computer-readable medium described herein may further include operations, features, means, or instructions for receiving a positive acknowledgement signal from the UE based at least in part on the second signal, the third signal, or a combination thereof.

Some examples of the method, apparatuses, and non-transitory computer-readable medium described herein may further include operations, features, means, or instructions for transmitting a third signal indicating that the at least one additional control channel monitoring set may be deactivated for the UE, where a deactivation indication may be transmitted over a DCI in the default control channel monitoring set configured for the UE. Some examples of the method, apparatuses, and non-transitory computer-readable medium described herein may further include operations, features, means, or instructions for receiving a positive acknowledgement signal from the UE based at least in part on the second signal, the third signal, or a combination thereof.

Some examples of the method, apparatuses, and non-transitory computer-readable medium described herein may further include operations, features, means, or instructions for transmitting a third signal indicating that a second component carrier may have been deactivated for the UE. Some examples of the method, apparatuses, and non-transitory computer-readable medium described herein may further include operations, features, means, or instructions for receiving a positive acknowledgement signal from the UE based at least in part on the second signal, the third signal, or a combination thereof.

Some examples of the method, apparatuses, and non-transitory computer-readable medium described herein may further include operations, features, means, or instructions for transmitting a positive acknowledgement signal from the UE based at least in part on the second signal.

DETAILED DESCRIPTION

Figure 1:
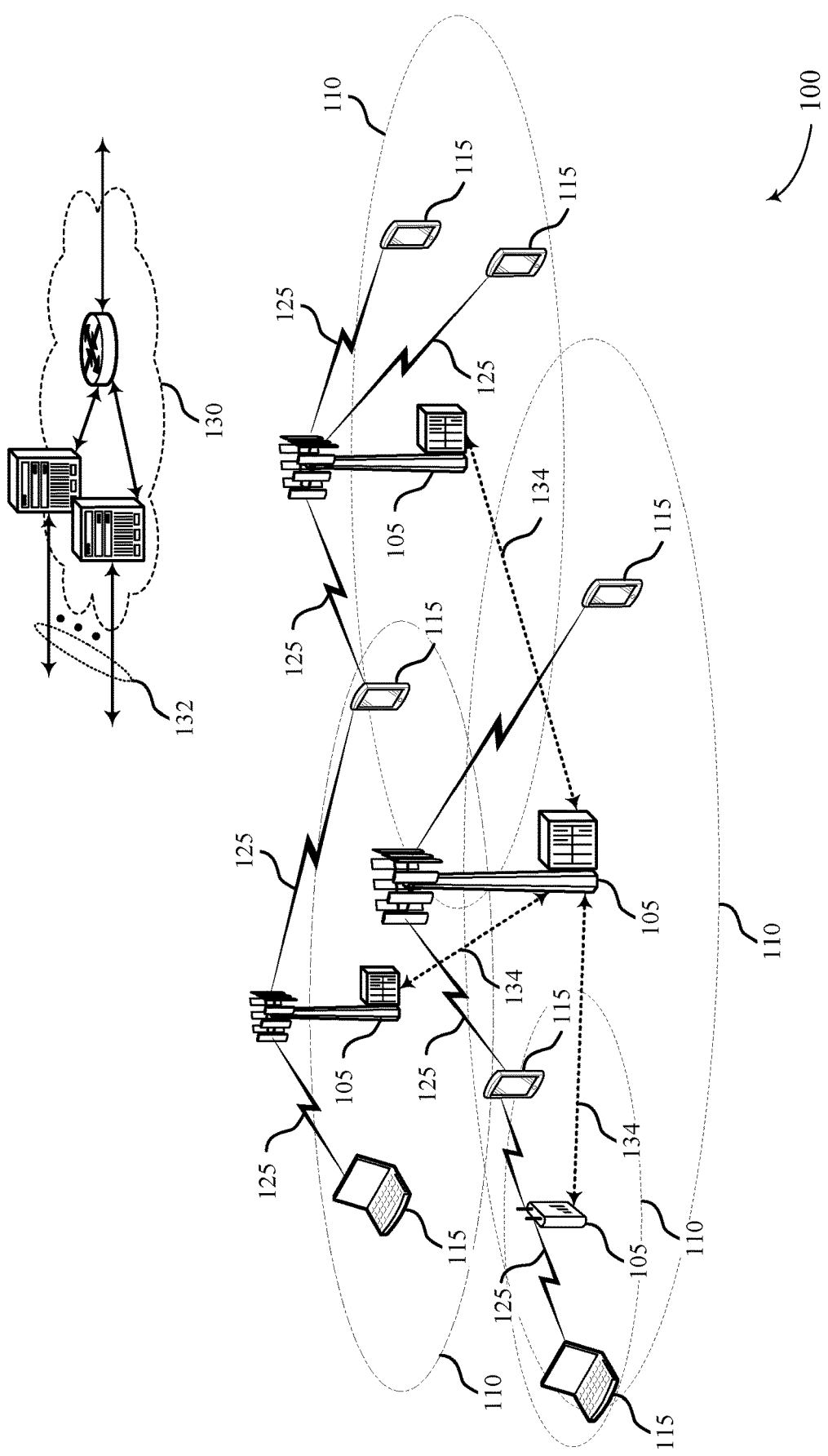
FIG. 1 illustrates an example of a system for wireless communications that supports dynamic control channel management in accordance with aspects of the present disclosure.

In some aspects, wireless communication systems may utilize a control region of a slot (or partial slot, mini-slot, and the like) to communicate control information. For example, a user equipment (UE) may be configured with a control channel monitoring set, e.g., which may include a control resource set (coreset), a search space (SS) set, a component carrier (CC) set, and the like, where the UE monitors for control information over the control channel monitoring set. Conventionally, the amount of resources configured for the control channel monitoring set are determined based on the amount of traffic typically communicated between the base station and the UE. However, in some examples the traffic conditions may change such that additional control resources need to be configured for the UE. Conventionally, the additional control resources are configured using various radio resource control (RRC) signaling, medium access control (MAC) control element (CE) signaling, and the like, between the base station and the UE. Such signaling schemes typically include a number of messages being exchanged between the base station and the UE, which requires over the air resources, increases the latency, and the like. Such conventional wireless communication systems may not be configured to support rapid changes in the control resources being configured for a UE.

As one example, a UE may be configured with a default coreset that is used by the UE to monitor for control information (e.g., grants). The UE typically monitors its default coreset to determine if it carries a grant and, if so, decodes the grant to identify where data is being communicated to the UE. During bursty communications or other dynamically changing traffic conditions, the base station may configure additional coresets for the UE to monitor using various configuration signaling, e.g., using RRC signaling, MAC CE signaling, and the like. However, such configuration signaling typically involves numerous signals being exchanged between the base station and the UE to configure the additional coresets, which introduces latency and/or may not otherwise be suitable in a bursty traffic condition. In some instances, the bursty traffic condition may end before the base station can configure the additional coresets for the UE, thus the exchanged signals are wasteful.

Aspects of the disclosure are initially described in the context of a wireless communication system. Broadly, the described techniques provide for an efficient mechanism for a base station to dynamically activate and/or deactivate additional control channel monitoring set(s) for a UE. For example, the base station may configure the UE with a set of available control channel monitoring sets (e.g., multiple available coresets, SS sets, CC sets, etc.). The UE may also be configured with a default control channel monitoring set (e.g., at least one control channel monitoring set from the set of available control channel monitoring sets and/or using different control resources) that the UE monitors for control information. The base station and/or UE, however, may determine that an additional control channel monitoring set is to be activated, e.g., in order to support communicating additional control information to the UE. In some aspects, the determination may be based on a second signal, which may be explicit or implicit, that activates the additional control channel monitoring set(s) from the available control channel monitoring sets. For example, the UE and/or base station may request activation of the additional control channel monitoring set(s) or may determine that activation is needed based on various traffic conditions, channel performance, and the like. Accordingly the second signal may be received by the UE that activates one or more of the additional control channel monitoring sets from the available control channel monitoring sets that have been configured for the UE. In some aspects, the second signal may be communicated in a downlink control information (DCI) communicated in the default control channel monitoring set. The base station and UE may communicate control information over the default control channel monitoring set and the additional control channel monitoring set(s). In some aspects, the additional control channel monitoring set(s) may be deactivated after a certain time, after a certain number of slots in which no control information is communicated, and/or based on other conditions and/or signaling exchanged between the base station and UE. Accordingly, the described techniques provide a mechanism where the UE can be preconfigured with the available control channel monitoring sets, and then additional control channel monitoring set(s) from the set of available control channel monitoring sets can be activated/deactivated dynamically as needed.

Aspects of the disclosure are further illustrated by and described with reference to apparatus diagrams, system diagrams, and flowcharts that relate to dynamic control channel management.

FIG. 1 illustrates an example of a wireless communications system 100 that supports dynamic control channel management in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A MAC layer may perform priority handling and multiplexing of logical channels into transport channels. The MAC layer may also use hybrid automatic repeat request (HARQ) to provide retransmission at the MAC layer to improve link efficiency. In the control plane, the RRC protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

A UE 115 may receive a first signal from a base station 105 indicating a set of available control channel monitoring sets to be used for receiving control information, e.g., physical downlink control channel (PDCCH). The UE 115 may receive, over a default control channel monitoring set of the available control channel monitoring sets configured for the UE 115, a second signal from the base station 105 activating at least one additional control channel monitoring set from the set of available control channel monitoring sets, the default control channel monitoring set comprising a subset of the set of available control channel monitoring sets. The UE 115 may receive control information over the default control channel monitoring set and the at least one additional control channel monitoring set at least partially in response to receiving the second signal.

A base station 105 may transmit a first signal to a UE 115 indicating a set of available control channel monitoring sets to be used for control information. The base station 105 may transmit, over a default control channel monitoring set of the available control channel monitoring set configured for the UE 115, a second signal from the base station 105 activating at least one additional control channel monitoring set from the set of available control channel monitoring sets, the default control channel monitoring set comprising a subset of the set of available control channel monitoring sets. The base station 105 may transmit control information over the default control channel monitoring set and the at least one additional control channel monitoring set at least partially in response to transmitting the second signal.

Figure 2:
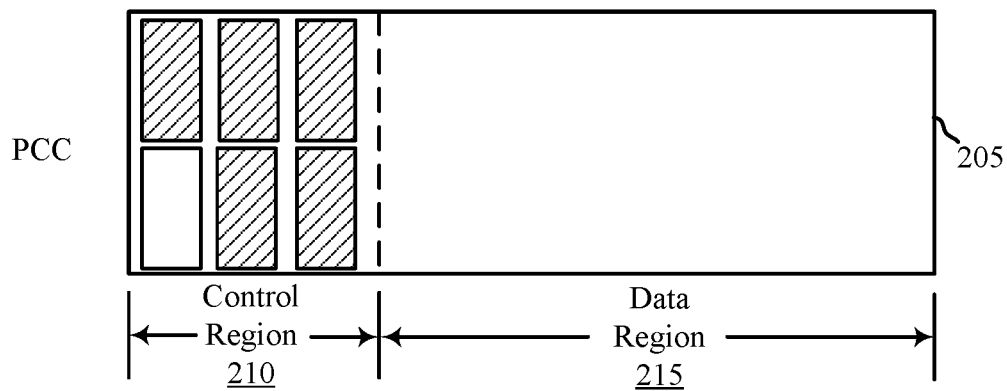
FIG. 2 illustrates an example of a control channel monitoring set configuration that supports dynamic control channel management in accordance with aspects of the present disclosure.
Figure 2:
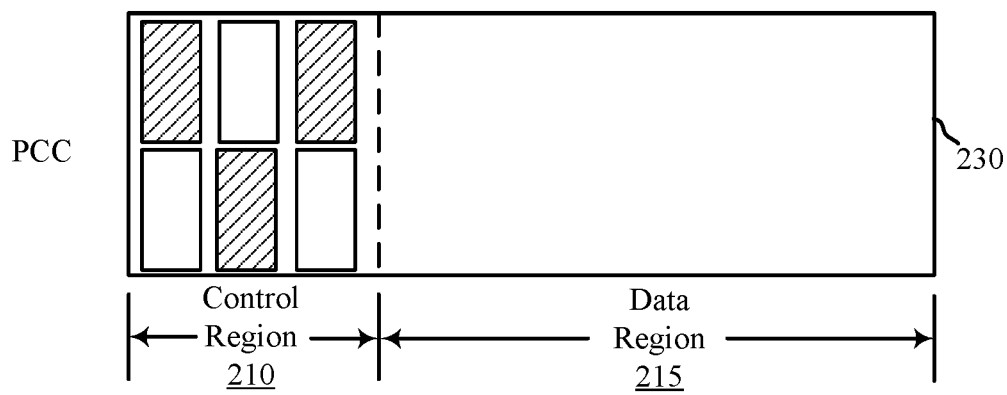
Figure 2:
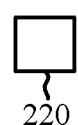
Figure 2:

FIG. 2 illustrates an example of a control channel monitoring set configuration 200 that supports dynamic control channel management in accordance with aspects of the present disclosure. In some examples, control channel monitoring set configuration 200 may implement aspects of wireless communication system 100. Aspects of control channel monitoring set configuration 200 may be implement by a UE and/or a base station, which may be examples of corresponding devices described herein.

In some aspects, wireless communication systems may be configured such that resources are configured on an as-needed basis. Configuring such resources may involve numerous messages being exchanged between wireless devices as resources are configured, and again as a resources are released. While this may be suitable in some situations, other scenarios may be more dynamic in nature such that the latency associated with configuring resources is unsuitable for the situation, e.g., during dynamic or bursty changes in traffic conditions. For example, ultra-reliable low-latency communication (URLLC) traffic may require high-priority and/or low-latency transmission. Accordingly, control channel monitoring set configuration 200 illustrates one example where a base station can dynamically activate and deactivate control resources for UE as needed, and more quickly than conventional configuration-based signaling schemes.

Broadly, control channel monitoring set configuration 200 illustrates an example control channel monitoring set configuration for a UE for a single CC (e.g., the primary CC or PCC), where some of the available control channel monitoring sets are activated or deactivated dynamically for the UE as needed. More particularly, control channel monitoring set configuration 200 illustrates a first time period 205, that comprises a control region 210 and a data region 215. In some aspects, the first time period 205 may be an example of a slot, a partial slot, a mini-slot, a transmission opportunity, a subframe, or any other time period configured for performing wireless communications. The control region 210 typically includes various time-frequency resources used for communicating control information, e.g., physical downlink control channel (PDCCH) and/or physical uplink control channel (PUCCH), between a base station and UEs. The data region 215 may include various time-frequency resources used for communicating data, e.g., physical downlink shared channel (PDSCH) and/or physical uplink shared channel (PUSCH), between the base station and UEs. In some aspects, the control information communicated during the control region 210 carries or otherwise conveys an indication of a grant for the resources in the data region 215. It will be noted that the control region(s) 210 and data region(s) 215 represent logical regions within wireless resources and the diagrams of FIG. 2 do not necessarily represent their locations with respect to each other within corresponding time/frequency resources.

In some aspects, a base station may configure a UE with a set of available control channel monitoring sets (e.g., comprising coresets, SS sets, etc.) to be used for communicating control information. For example, the base station may transmit a first signal to the UE that identifies or otherwise indicates the set of available control channel monitoring sets. In the example control channel monitoring set configuration 200, the set of available control channel monitoring set includes each of the six control channel monitoring sets (e.g., one active control channel monitoring set 220 and five inactive control channel monitoring set 225) illustrated during the control region 210 of time period 205. In some aspects, the base station may configure the UE with the set of available control channel monitoring sets using RRC signaling, MAC CE signaling, or some other suitable means. In some aspects, each of the available control channel monitoring sets may have a corresponding identifier, such as an index number. Accordingly, the base station and the UE may each be configured with the set of available control channel monitoring sets, and their corresponding identifier or index number.

In some aspects, at least one of the available control channel monitoring sets may be considered a default control channel monitoring set configured for the UE. During the first time period 205, the active control channel monitoring set 220 may generally be considered the default control channel monitoring set (or a set of default control channel monitoring sets) for the UE. In some aspects, the default control channel monitoring set may be a subset of control resources from the available control channel monitoring sets. In one embodiment, the UE may monitor the default control channel monitoring set during some or all slots. In one embodiment, the UE may default to monitoring the default control channel monitoring set(s), but may stop monitoring if explicitly deactivated. During the first time period 205, the other control channel monitoring sets are inactive control channel monitoring set 225, e.g., are configured for the UE, but are not activated during the time period 205. Accordingly, the UE may not be configured to monitor the inactive control channel monitoring set 225 during the first time period 205. Moreover, the base station may not communicate control information over the inactive control channel monitoring set 225 during the first time period 205.

In some aspects, one or more additional control channel monitoring sets may be activated for the UE during the second time period 230. For example, a base station may transmit a second signal to the UE over the default control channel monitoring set (e.g., active control channel monitoring set 220 during the first time period 205). Generally, the second signal may carry or otherwise convey an indication activating the one or more additional control channel monitoring sets from the set of available control channel monitoring sets. In some aspects, the second signal may be communicated using a DCI, and/or some similar field, indicated over the default control channel monitoring set during the first time period 205. In some aspects, the second signal may activate the one or more additional control channel monitoring sets during a second time period 230. Accordingly, during the second time period 230 the base station may communicate control information to the UE over the active control channel monitoring sets 220, which includes the default control channel monitoring set as well as the one or more additional control channel monitoring sets (with two additional control channel monitoring sets being shown activated during the second time period 230 by way of example only). In some aspects, the UE may send feedback (e.g., HARQ ACK) in response to the reception of the second signal.

In some aspects, the second signal may be an explicit request signal that activates the one or more additional control channel monitoring sets. For example, the base station may receive a request signal from the UE requesting activation of the additional control channel monitoring set(s), in which the request signal serves as the second signal. In another example, the base station may transmit a request signal to the UE that activates the additional control channel monitoring set(s), in which the request signal again serves as the second signal.

In other aspects, the second signal may be an implicit request signal that activates the one or more additional control channel monitoring sets for the UE. As one example, the one or more additional control channel monitoring sets may be activated based on (e.g., in response to) changes in a traffic condition. For example, the UE and/or the base station may detect or otherwise determine that traffic conditions between the base station and UE have satisfied a threshold, and therefore activate the additional control channel monitoring set(s) to support the traffic conditions. In one example, this may be based on a buffer status report (BSR) and/or scheduling request (SR), which indicates that a predetermined amount of data is to be communicated between base station and the UE. Accordingly, the additional control channel monitoring set(s) may be activated in order to provide sufficient control information to allow sufficient grants to be conveyed in the control information to support the additional traffic. In this example, the BSR, SR, and the like, may serve as the second signal.

In another example, the traffic conditions may be based on various channel performance metrics. For example, the base station and/or the UE may determine that a predetermined number of HARQ feedback signals (e.g., NACK signals) have occurred, thus indicating an inability to detect or decode data being communicated. Accordingly, this may provide an indication that the channel performance has satisfied a threshold (e.g., has fallen below a threshold), and therefore additional control channel monitoring set(s) may be needed to improve the communications, e.g., to improve redundancy. Accordingly, the one or more additional control channel monitoring sets may be activated in response to the channel performance metrics (e.g., traffic conditions) satisfying the threshold. In this example, the HARQ feedback signals may serve as the second signal.

In another example, the one or more additional control channel monitoring sets may be activated based on one or more secondary CCs being activated for the UE. For example, a UE may transmit a request signal to a base station requesting activation of the one or more secondary CCs, in which the request signal serves as the second signal. In other aspects, the base station may transmit a request signal to the UE (e.g., an activation signal) that activates one or more secondary CCs, in which the request signal again serves as the second signal.

In another example, one or more additional control channel monitoring sets may be activated based on one or more secondary cells (SCells) being activated for the UE. Again, activation of the one or more SCells may be based on a UE requesting activation in a request signal and/or on a base station activating the one or more SCells in a request signal (e.g., an activation signal), where the request signal serves as the second signal activating the one or more additional control channel monitoring sets.

In some aspects, the second signal is communicated in the DCI (e.g., such as when the second signal originates from the base station) or in a UCI (e.g., such as when the second signal originates from the UE). In some aspects, the DCI (or UCI) may be communicated over the default control channel monitoring set. In some aspects, the DCI (or UCI) may be communicated during a time period occurring before the time period in which the one or more additional control channel monitoring sets are to be activated.

In some aspects, a timer may be associated with each of the one or more additional control channel monitoring sets that are activated for the UE. For example, the UE and/or the base station may initiate a timer in response to the second signal, with the timer being initiated for each, a portion, or all of the additional control channel monitoring set(s). In some aspects, the additional control channel monitoring set(s) may be deactivated upon expiration of the corresponding timer, e.g., the one or more additional control channel monitoring set(s) are only activated for a predetermined time period that the timer is set to. In some aspects, the additional control channel monitoring set(s) may be deactivated upon expiration of the corresponding timer after a predetermined number of slots have occurred in which no control communication is communicated over the additional control channel monitoring set(s). In some aspects, the timer for each of the one or more additional control channel monitoring set(s) may be restarted anytime control information is received over the corresponding additional control channel monitoring set.

In some aspects, the one or more additional control channel monitoring set(s) may be deactivated explicitly. For example, the base station may transmit a third signal to the UE that indicates that the one or more additional control channel monitoring sets are deactivated. In some aspects, the third signal may be communicated in a DCI, e.g., in the default control channel monitoring set that is configured for that the UE. In some aspects, the deactivation signal (e.g., the third signal) may deactivate one or more secondary CCs and/or SCells, in which this also serves to deactivate the corresponding additional control channel monitoring sets.

Accordingly, the base station may transmit control information to the UE in the control region 210 during the second time period 230. In some aspects, the control information may be communicated in the active control channel monitoring set 220, which includes the default control channel monitoring set and the additional control channel monitoring set(s) that have been activated for the UE. Generally, the control information may be any control signaling and, in one example, may include grants for resources occurring during the data region 215 of the second time period 230.

Thus, in some aspects, to facilitate the UE's power saving operations, the base station may dynamically change and indicate the number of control channel monitoring sets (e.g., coresets, SS set, and/or CCs, that a UE monitors for control channel (e.g., PDCCH) decoding. The control channel monitoring set may be selected as a subset of UE specifically configured coresets, SS sets, and/or CCs, and the like. The subset of control channel monitoring set selection may depend on a UE's request, traffic conditions, power/thermal status, etc. Within an active SCell, control channel monitoring set monitoring may be dynamically activated/deactivated. In some aspects, the described techniques may be used in conjunction with conventional MAC CE based configuration signaling. The base station may use RRC signaling (e.g., the first signal) for the configuration of the available control channel monitoring sets (e.g., preconfigured coresets, SS sets, and or serving cells (SCells)). In some aspects, the described techniques may be based on short-term metrics and dynamic signaling (e.g., using a DCI)—instead of re-configuring resources. Instead, only dynamic activation/deactivation of configured additional control channel monitoring set(s) may be used.

In some aspects, the UE initially monitors the default control channel monitoring set (e.g., coresets, SS sets, and/or CCs) for L1/L2 control channel (PDCCH) signaling, e.g., control information. In some aspects, the default control channel monitoring set (e.g., coresets/SS sets) may be those in the primary cell (PCell or primary serving cell (PSCell)) in CA operations. In some aspects, control channel monitoring set(s) (e.g., coresets/SS sets) in some SCells may be configured as default control channel monitoring sets. When the traffic load is small, monitoring by the UE of only a small number of default control channel monitoring sets may be sufficient because the control traffic demand is also low. By monitoring only a small number of default control channel monitoring sets, the UE can save its baseband processing power, which is beneficial for extending the battery lifetime and standby time.

Under certain conditions, the base station may dynamically activate one or more additional control channel monitoring sets (e.g., additional coresets, SS sets, etc.). Once activated, the UE may start monitoring the one or more additional control channel monitoring sets as well as the default control channel monitoring set. The base station may send additional control message(s) (e.g., PDCCH) through the default and one or more additional control channel monitoring sets, and schedule more data channels (e.g., PDCCH and PUCCH) for the UE.

In some aspects, an activation condition for the additional control channel monitoring set(s) from the base station perspective may include arrival of heavy and/or bursty traffic for the UE. Another activation condition may include successive decoding failure of HARQ retransmission, e.g., if downlink and/or uplink data decoding failures after the K-th retransmission (K may be a configured number), the base station and/or UE may decide to activate additional control channel monitoring set(s) (e.g., may decide to try other coresets/SS sets and CCs).

In some aspects, the activation condition for the additional control channel monitoring set(s) from the UE perspective may include the UE requesting the activation to the base station, e.g., an explicit request. Another activation condition may include the UE sending a BSR. For example, based on the UE's BSR (e.g., the UE's buffer is >x % full), based on a quality of service (QoS) requirement, etc., the base station may decide whether to activate additional control channel monitoring set(s). Another activation condition may include the UE sending a SR through a certain CC. For example, CC0 (PCell) may be the default CC for control channel monitoring, and CC1 (SCell) has an inactive control channel monitoring set. The UE may send a SR on CC1, and the base station may activate the additional control channel monitoring set(s) within CC1 based on the SR.

It is to be understood that the described techniques may be combined with other techniques. For example, other signaling methods (e.g., PUCCH, MAC-CE, etc.) are not precluded. Instead, through PUCCH or MAC-CE the UE may deliver an uplink message including additional control channel monitoring sets that the UE wants to be activated.

In some aspects, different dynamic signaling methods may be used to indicate activation of the additional control channel monitoring set(s), e.g., may serve as the second signal. In one example, the base station may use DCI signaling through the default control channel monitoring set to signal activation of the additional control channel monitoring set(s). In some aspects, a special DCI format may be defined for the additional control channel monitoring set activation. For example, bit and/or fields in the DCI may include the index or other identifier of the additional control channel monitoring set(s) (including coreset, SS set and CC index) to be activated. In some aspects, a single DCI may activate multiple additional control channel monitoring sets. In some aspects, cross-carrier scheduling may be interpreted as activation of additional control channel monitoring set(s) within the scheduled CC. In some aspects, a carrier identification field (CIF) in the DCI may indicate a CC, which serves to activate the additional control channel monitoring set(s) within the CC. In some aspects, a MAC-CE message may also be used. For example, the MAC-CE message may include indices of additional control channel monitoring set(s) (e.g., coresets, SS set and CC indices) to be activated, may indicate a time of activation, a duration of activation, etc.

In other aspects, no signaling may be used for the activation of the additional control channel monitoring set(s). For example, if the activation if based on a UE's request, no explicit indication from the base station may be needed. As another example, the signaling for the activation may be event triggered, e.g., successive decoding failure of a predetermined number of HARQ retransmissions.

In some aspects, dynamic additional control channel monitoring set(s) activation may be complementary to DRX operations and can be performed together. For example, when an additional control channel monitoring set is inactive, the UE may not need to wake up for PDCCH monitoring within the additional control channel monitoring set(s).

In some aspects, various deactivation procedures may be used for the activated additional control channel monitoring set(s). For example, the activated additional control channel monitoring set (other than default control channel monitoring set) may be deactivated under certain conditions, e.g., when the traffic condition demand becomes low. In some examples, the deactivation may be timer based. For example, when an additional control channel monitoring set is activated, a corresponding timer may also be started for the additional control channel monitoring set. In some aspects, the UE may stop monitoring the additional control channel monitoring set(s) when the timer expires. In some aspects, the UE and/or base station may restart the timer when PDCCH (e.g., control information) is successfully decoded within the additional control channel monitoring set.

In some aspects, the timer may be on a per CC or per additional control channel monitoring set (if there are multiple control channel monitoring sets within a CC) basis. In some aspects, the timer value (e.g., active duration) may be determined as a part of CC, coreset, or SS set configuration, e.g., as signaled in the first signal. In other aspects, the timer value may be indicated with the additional control channel monitoring set activation command, e.g., in the second signal.

In some aspects, the additional control channel monitoring set(s) deactivation may be signaling-based. For example, a special DCI signaling can be used to indicate deactivation of the additional control channel monitoring sets(s). This DCI may be delivered in a default control channel monitoring set. In some aspects, cross-carrier scheduling for a CC may be interpreted as deactivation of the CC, which in turn serves to deactivate the additional control channel monitoring set(s). In some aspects, the UE may send a deactivation request to the base station over a SR, PUCCH, etc.

In some aspects, the timer-based and signaling-based deactivation can be used together to complement each other. Accordingly, even when the UE misses a deactivation signal, the additional control channel monitoring set(s) is deactivated at the timer expiry.

Figure 3:
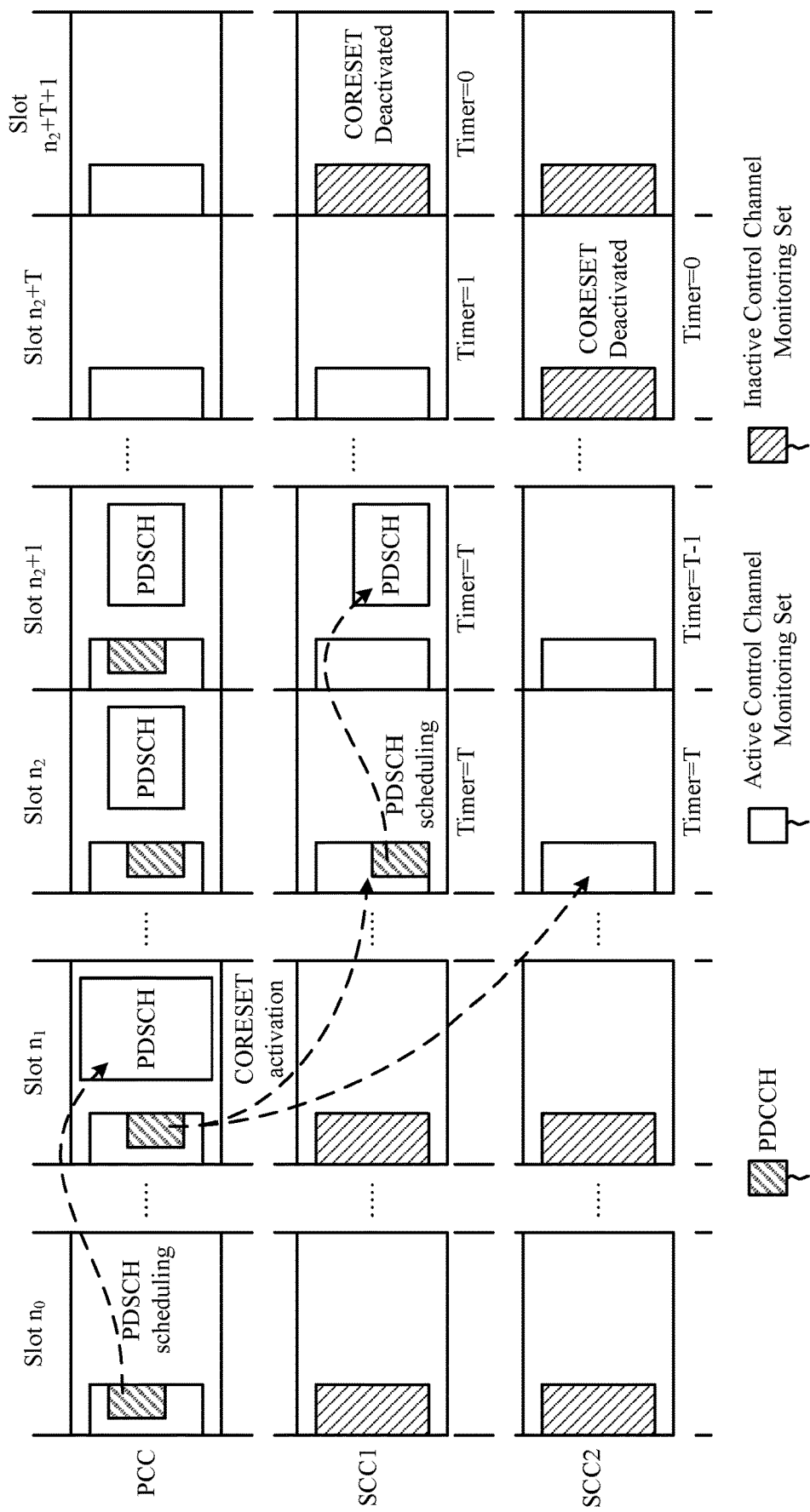
FIG. 3 illustrates an example of a control channel monitoring set configuration that supports dynamic control channel management in accordance with aspects of the present disclosure.

FIG. 3 illustrates an example of a control channel monitoring set configuration 300 that supports dynamic control channel management in accordance with aspects of the present disclosure. In some examples, control channel monitoring set configuration 300 may implement aspects of wireless communication system 100 and/or control channel monitoring set configuration 200. Aspects of control channel monitoring set configuration 300 may be implement by a UE and/or a base station, which may be examples of corresponding devices described herein. Broadly, control channel monitoring set configuration 300 illustrates an example where one or more additional control channel monitoring sets are activated and/or deactivated for different CCs, e.g., for the PCC, SCC1 and SCC2.

Generally, control channel monitoring set configuration 300 illustrates multiple time periods in which wireless communications are performed using one or more CCs. The time periods are generally illustrated as slots, but other time periods may also be utilized in accordance with aspects of the described techniques. Generally, the UE may initially be configured to communicate with the base station over the PCC. The UE may be configured for communications using one or more SCCs, e.g., SCC1 and SSC2 in the example control channel monitoring set configuration 300. In some aspects, the SCCs may be associated with a PCell and/or with one or more SCells.

Generally, the base station may configure a UE with a set of available control channel monitoring sets to use for communicating control information. For example, the base station may transmit a first signal (e.g., an RRC signal) that configures the UE with the set of available control channel monitoring sets. In some aspects, the set of available control channel monitoring sets includes a default control channel monitoring set as well as one or more additional control channel monitoring sets that can be activated dynamically for the UE. In the example control channel monitoring set configuration 300, during a first slot (e.g., slot no) the base station may transmit a signal in the active control channel monitoring set 310 over the PCC, e.g., over the default control channel monitoring set configured for the UE. In some aspects, this control information may schedule (e.g., grant) resources for downlink communications (e.g., PDSCH) during slot $n_1$. During slot $n_0$, the one or more additional control channel monitoring sets for SCC1 and SCC2 are inactive control channel monitoring sets 315. During slot $n_1$, the base station may transmit the downlink communications on the indicated PDSCH resources.

During slot $n_1$, the base station may also transmit, over the default control channel monitoring set of PCC, a second signal that activates at least one additional control channel monitoring set from the set of available control channel monitoring sets. In the example control channel monitoring set configuration 300, the second signal communicated during slot $n_1$ activates one additional control channel monitoring set for SCC1 and a second additional control channel monitoring set for SCC2. In some aspects, the second signal may carry or otherwise convey an indication of an index for the additional control channel monitoring set(s) corresponding to SCC1 and SCC2. In some aspects, the second signal may also identify a time component in which the additional control channel monitoring set(s) are being activated, e.g., may provide an indication that the additional control channel monitoring set(s) are being activated for slot $n_2$.

Accordingly and during slot $n_2$, the UE may monitor the active control channel monitoring sets 310 for PCC, SCC1 and SCC2, e.g., the default control channel monitoring set and the activated additional control channel monitoring sets. In some aspects, the base station may transmit PDCCH 305 in the active control channel monitoring sets 310 of the PCC and SCC1 (e.g., over the default control channel monitoring set and at least one of the additional control channel monitoring sets) during slot $n_2$. The base station however may not transmit control information over the active control channel monitoring set 310 of SCC2 during slot $n_2$. The PDCCH 305 transmitted during slot $n_2$ typically may be control information that carries or otherwise conveys an indication of resources for downlink communications, e.g., a grant for the PDSCH resources occurring during slot $n_2$ and/or slot $n_{2+1}$. Accordingly, the UE may receive and decode the PDCCH 305 communicated over the default control channel monitoring set and the additional control channel monitoring set activated on SCC1 and identify the resources indicated in the grant. The UE may receive the corresponding downlink data over the indicated resources.

During slot $n_{2+1}$, the base station may transmit control information over the default control channel monitoring set (e.g., in PDCCH 305 over the active control channel monitoring set 310 of PCC). However, the base station may not communicate control information over the additional control channel monitoring sets of SCC1 and SCC2 during slot $n_{2+1}$.

In some aspects, mechanisms may be provided to deactivate the one or more additional control channel monitoring sets. In one example, this may include a timer that is initiated for each of the one or more control channel monitoring sets (identified as Timer=T in the control channel monitoring set configuration 300, wherein T represents a predetermined time in absolute or relative time). In some aspects, the timer may be associated with actual time and/or based on time relative to slots that control information is or is not communicated in.

With respect to the additional control channel monitoring set activated for SCC1, the timer may be initiated during slot $n_2$. In some examples, the timer may be configured to run a predetermined length and then, upon expiry, the additional control channel monitoring set for SCC1 is automatically deactivated. In other examples, as is shown in control channel monitoring set configuration 300, the timer may be based on a number of slots in which no control information is communicated. For example, upon activation of the additional control channel monitoring set for SCC1, a timer may be started during slot $n_2$. During slot $n_{2+1}$, the timer may be restarted (e.g., set to T again) based on the control information being communicated in slot $n_2$. The timer may continue to run until slot n2+T, which may be a predetermined number of slots that no control information is communicated over the additional control channel monitoring sets. Accordingly, the additional control channel monitoring set activated for SCC1 may deactivate during slot $n_{2+T+1}$.

With respect to the additional control channel monitoring set activated for SCC2, a separate timer may be initiated during slot $n_2$. Due to the fact that no control information is communicated over the additional control channel monitoring set during slot $n_2$ of SCC2, the timer may continue to run during slot $n_{2+1}$. At slot $n_{2-T}$, the timer may expire (e.g., reach zero) and the additional control channel monitoring set for SCC2 may be deactivated.

Thus, in some aspects the UE initially only monitors a coreset/SS set in PCC (default control channel monitoring set). The additional control channel monitoring sets (e.g., coresets/SS sets) in SCC1 and SCC2 at slot $n_2$ are activated by the PDCCH in PCC carried over PDCCH 305 at slot $n_1$. Timers may be started in SCC1 and SCC2 for the additional control channel monitoring sets that are being activated. PDCCH 305 in SCC1 at slot $n_2$ may restart the timer of SCC1 at slot $n_2+1$. With no PDCCH detected in SCC2, the timer expires at slot $n_2+T$, and the additional control channel monitoring set (e.g., coreset/SS set) in SCC2 is deactivated. For SCC1, the additional control channel monitoring set (e.g., coreset/SS set) is deactivated at slot $n_2+T+1$ with the expiry of the timer.

Figure 4:
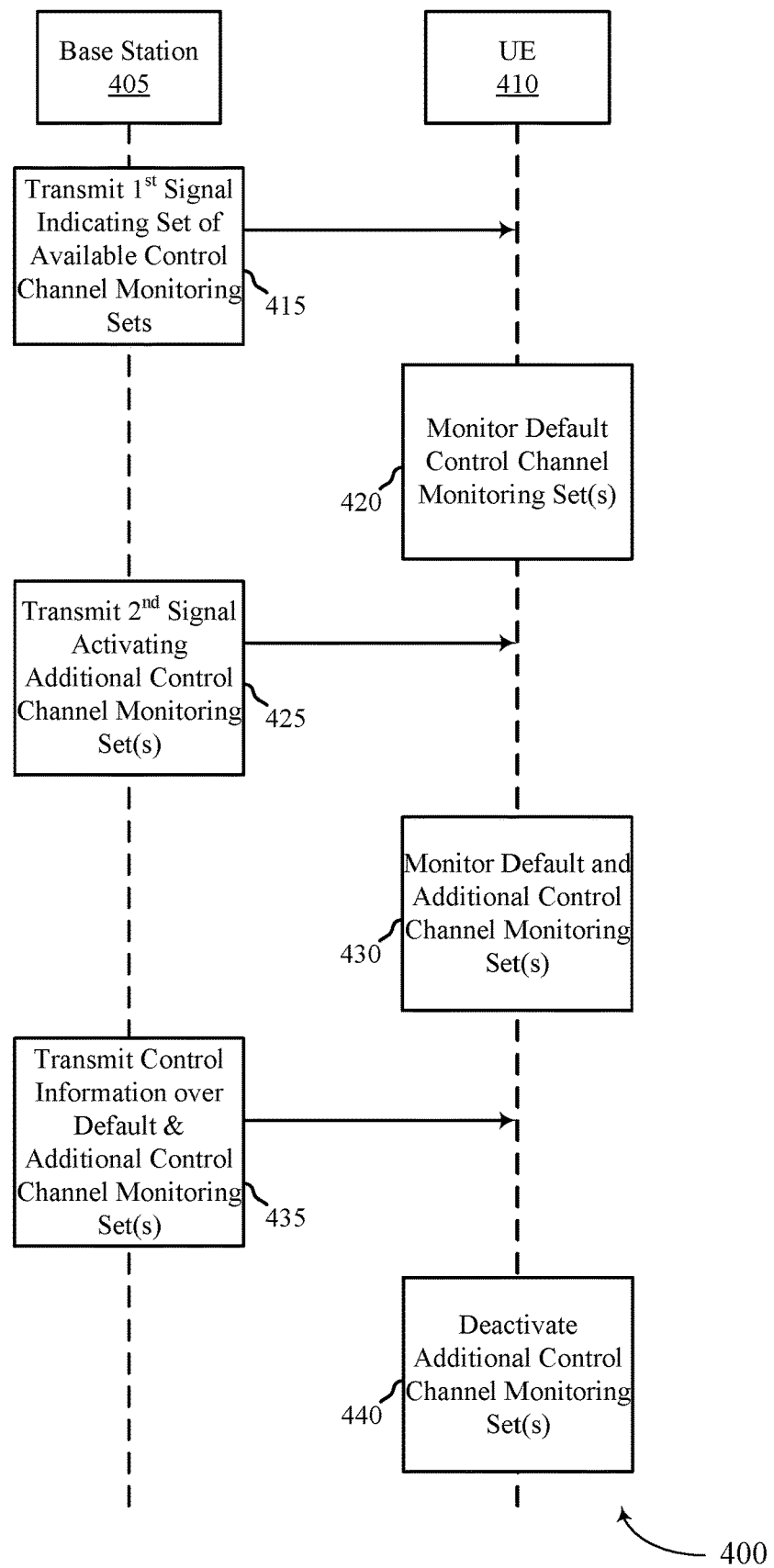
FIG. 4 illustrates an example of a process that supports dynamic control channel management in accordance with aspects of the present disclosure.

FIG. 4 illustrates an example of a process 400 that supports dynamic control channel management in accordance with aspects of the present disclosure. In some examples, process 400 may implement aspects of wireless communication system 100 and/or control channel monitoring set configurations 200/300. Process 400 may include a base station 405 and the UE 410, which may be examples of corresponding devices described herein.

At 415, base station 405 may transmit (and UE 410 may receive) a first signal that carries or otherwise provides an indication of a set of available control channel monitoring sets to be used for control information. In some aspects, the first signal may be communicated via RRC signaling. In some aspects, each available control channel monitoring set in the set of available control channel monitoring sets may have a corresponding identifier or index number. In some aspects, one of the available control channel monitoring sets may be considered a default control channel monitoring set that the UE monitors for control information.

At 420, UE 410 may monitor the default control channel monitoring set. For example, UE 410 may monitor PDCCH from base station 405 to detect control information, e.g., a grant of resources for performing communications, configuration information, and the like.

At 425, base station 405 may transmit (and UE 410 may receive) a second signal over a default control channel monitoring set that is a subset of the set of available control channel monitoring sets. In some aspects, the second signal may activate one additional control channel monitoring set or a plurality of additional control channel monitoring sets. In some aspects, the second signal may activate one or more additional control channel monitoring sets for the PCC or for the PCC and one or more SCCs.

In some aspects, the second signal may carry or otherwise convey an indication activating at least one additional control channel monitoring set from the set of available control channel monitoring sets. In some aspects, the second signal may be communicated in response to UE 410 transmitting (and base station 405 receiving) a request signal for activation of the at least one additional control channel monitoring set. In some aspects, this may include UE 410 transmitting (and base station 405 receiving) a predetermined number of NACK signals. In some aspects, this may include base station 405 and/or UE 410 determining that a traffic condition associated with communications has satisfied a threshold, e.g., a traffic load has increased beyond a predetermined amount, channel performance has decreased beyond a predetermined value, and the like. In some aspects, the request signal may be a BSR and/or an SR. In some examples, UE 410 may transmit (and base station 405 may receive) the SR on a second CC configured for the UE 410. In some aspects, the request signal may be transmitted in a UCI. In other aspects, the request signal may be transmitted in a MAC CE and/or in a PUCCH.

In some aspects, an activation signal for an SCC for the UE 410 may serve as the second signal, e.g., may activate an additional control channel monitoring set corresponding to the SCC. In some aspects, an activation signal for a SCell for the UE 410 may also serve as the second signal, e.g., may activate an additional control channel monitoring set corresponding to the SCell.

At 430, UE 410 may begin monitoring the default and the additional control channel monitoring sets. For example, UE 410 may monitor PDCCH for control information over a PCC and/or a SCC that corresponds to the default and additional control channel monitoring sets.

At 435, base station 405 may transmit (and UE 410 may receive) control information over the default control channel monitoring set and the additional control channel monitoring set(s) based at least in part on the second signal.

At 440, UE 410 may deactivate one or more of the additional control channel monitoring set(s). In some aspects, base station 405 and/or UE 410 may initiate a timer for each of the at least one additional control channel monitoring sets. In some aspects, the timer may stop after a predetermined time period and the corresponding additional control channel monitoring set may be deactivated once the timer stops. In some aspects, the timer may stop after a predetermined number of slots in which no control information is received over the additional control channel monitoring set, again with the corresponding additional control channel monitoring set being deactivated once the timer stops. In some aspects, the timer may be restarted whenever control information is received over the corresponding additional control channel monitoring set. In some aspects, a separate timer may be initiated or otherwise associated with each activated additional control channel monitoring set.

In some aspects, the activation of the one or more additional control channel monitoring sets may be based on a third signal. As one example, the third signal may carry or otherwise convey an indication explicitly deactivating one or more of the additional control channel monitoring sets. The third signal may be carried or otherwise conveyed in a DCI in the default control channel monitoring set. UE 410 may refrain from monitoring deactivated additional control channel monitoring sets. In other examples, the third signal may include an indication deactivating an SCC and/or SCell, which serves to deactivate the corresponding additional control channel monitoring sets.

In some aspects, UE 410 may continue to monitor the default control channel monitoring set once the additional control channel monitoring set(s) have been deactivated.

Figure 5:
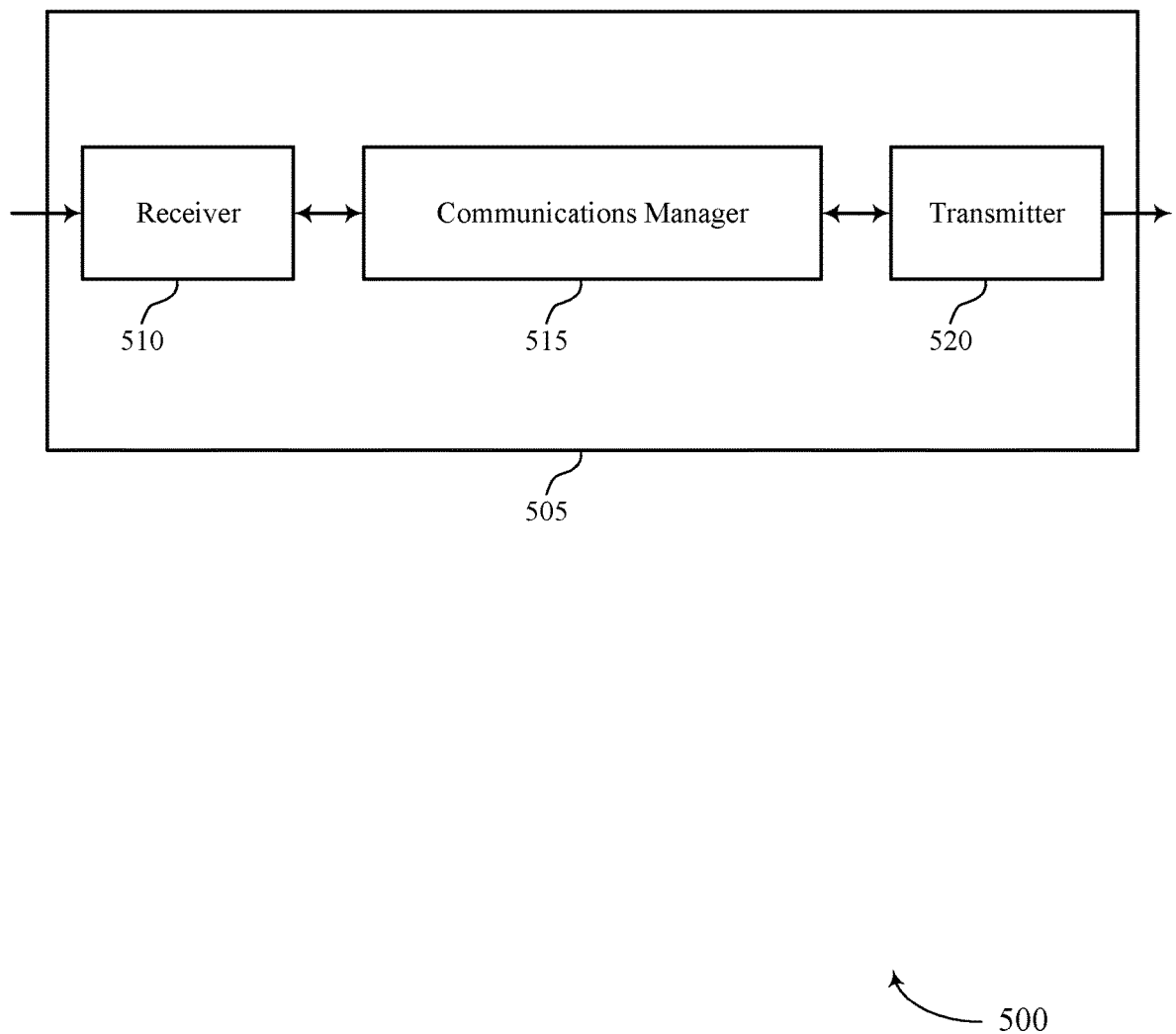
FIGS. 5 and 6 show block diagrams of devices that support dynamic control channel management in accordance with aspects of the present disclosure.

FIG. 5 shows a block diagram 500 of a device 505 that supports dynamic control channel management in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to dynamic control channel management, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may receive a first signal from a base station indicating a set of available control channel monitoring sets to be used for control information, receive, over a default control channel monitoring set of the available control channel monitoring sets configured for the UE, a second signal from the base station activating at least one additional control channel monitoring set from the set of available control channel monitoring sets, the default control channel monitoring set including a subset of the set of available control channel monitoring sets, and receive control information over the default control channel monitoring set and the at least one additional control channel monitoring set at least partially in response to receiving the second signal. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
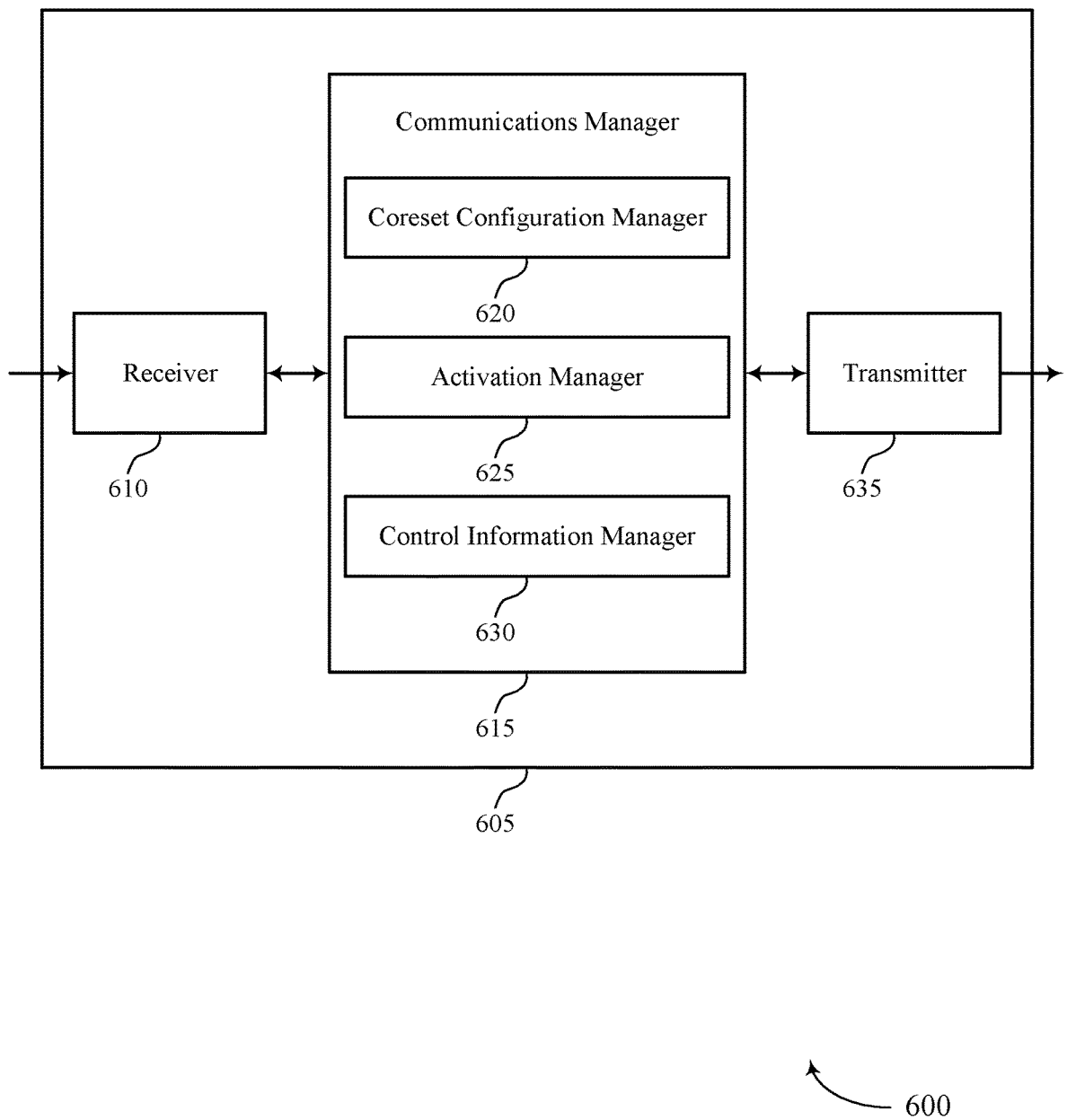

FIG. 6 shows a block diagram 600 of a device 605 that supports dynamic control channel management in accordance with aspects of the present disclosure. The device 605 may be an example of aspects of a device 505 or a UE 115 as described herein. The device 605 may include a receiver 610, a communications manager 615, and a transmitter 635. The device 605 may also include a processor. Each of these components may be in communication with one another (e.g., via one or more buses).

The receiver 610 may receive information such as packets, user data, or control information associated with various information channels (e.g., control channels, data channels, and information related to dynamic control channel management, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a coreset configuration manager 620, an activation manager 625, and a control information manager 630. The communications manager 615 may be an example of aspects of the communications manager 810 described herein.

The coreset configuration manager 620 may receive a first signal from a base station indicating a set of available control channel monitoring sets to be used for control information.

The activation manager 625 may receive, over a default control channel monitoring set of the available control channel monitoring sets configured for the UE, a second signal from the base station activating at least one additional control channel monitoring set from the set of available control channel monitoring sets, the default control channel monitoring set including a subset of the set of available control channel monitoring sets.

The control information manager 630 may receive control information over the default control channel monitoring set and the at least one additional control channel monitoring set at least partially in response to receiving the second signal.

The transmitter 635 may transmit signals generated by other components of the device 605. In some examples, the transmitter 635 may be collocated with a receiver 610 in a transceiver module. For example, the transmitter 635 may be an example of aspects of the transceiver 820 described with reference to FIG. 8. The transmitter 635 may utilize a single antenna or a set of antennas.

Figure 7:
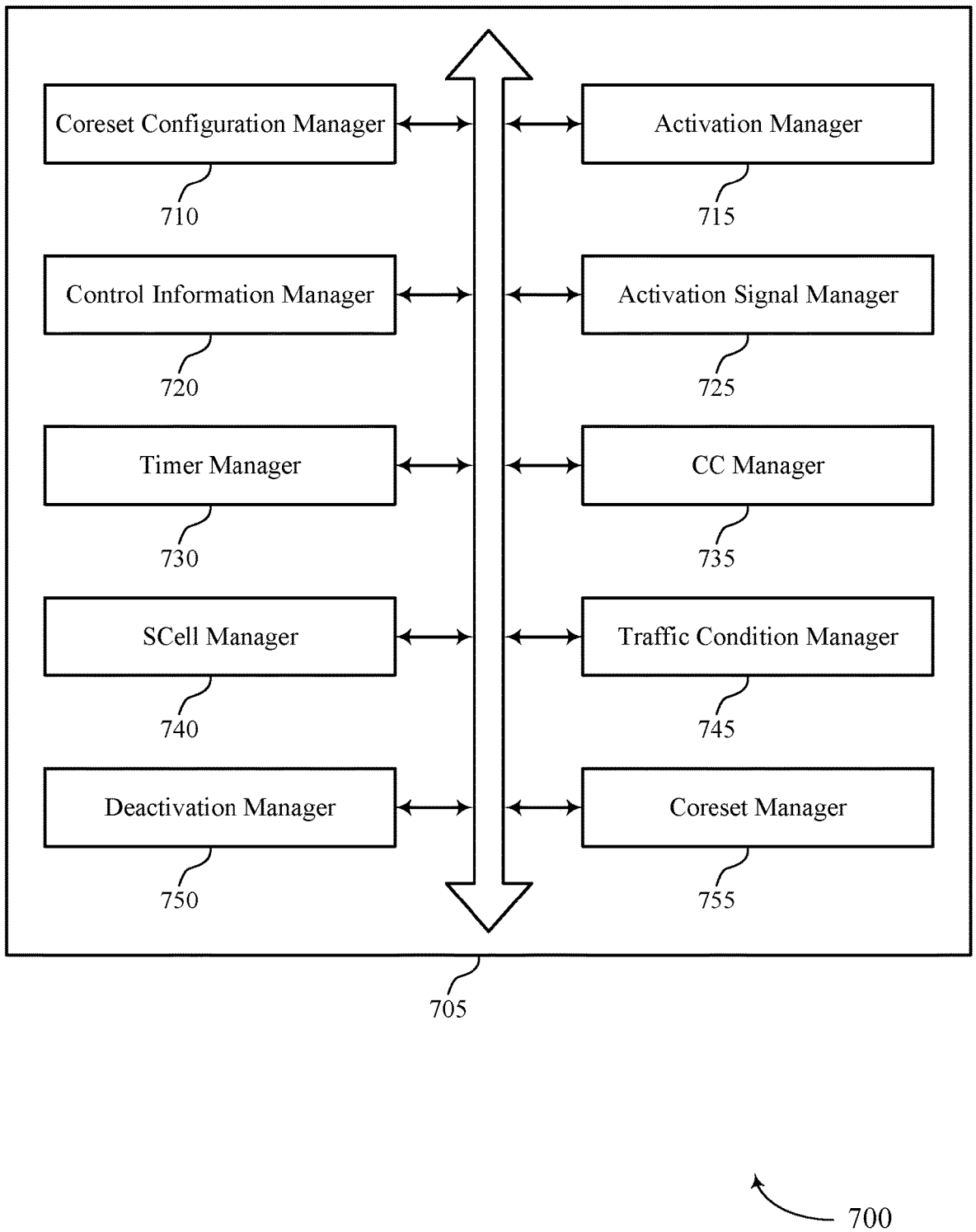
FIG. 7 shows a block diagram of a communications manager that supports dynamic control channel management in accordance with aspects of the present disclosure.

FIG. 7 shows a block diagram 700 of a communications manager 705 that supports dynamic control channel management in accordance with aspects of the present disclosure. The communications manager 705 may be an example of aspects of a communications manager 515, a communications manager 615, or a communications manager 810 described herein. The communications manager 705 may include a coreset configuration manager 710, an activation manager 715, a control information manager 720, an activation signal manager 725, a timer manager 730, a CC manager 735, a sCell manager 740, a traffic condition manager 745, a deactivation manager 750, and a coreset manager 755. Each of these modules may communicate, directly or indirectly, with one another (e.g., via one or more buses).

The coreset configuration manager 710 may receive a first signal from a base station indicating a set of available control channel monitoring sets to be used for control information.

The activation manager 715 may receive, over a default control channel monitoring set of the available control channel monitoring sets configured for the UE, a second signal from the base station activating at least one additional control channel monitoring set from the set of available control channel monitoring sets, the default control channel monitoring set including a subset of the set of available control channel monitoring sets. In some cases, the second signal is received over a DCI, the DCI indicating an index for the at least one additional control channel monitoring set. In some cases, the second signal is received over at least one of a MAC CE, or a PDCCH, or a combination thereof. In some cases, the at least one additional control channel monitoring set is associated with a primary component carrier, or a secondary component carrier, or a combination thereof.

The control information manager 720 may receive control information over the default control channel monitoring set and the at least one additional control channel monitoring set at least partially in response to receiving the second signal.

The activation signal manager 725 may transmit a request signal to the base station for activation of the at least one additional control channel monitoring set, where the second signal is received based on the request signal. In some examples, transmitting a predetermined number of NACK signals to the base station, where the request signal includes the predetermined number of NACK signals.

In some examples, the activation signal manager 725 may determine that a traffic condition associated with communications with the base station has satisfied a threshold, where the request signal is transmitted in response to the traffic condition satisfying the threshold. In some cases, the traffic condition includes at least one of a predetermined amount of data for communicating with the base station, or a traffic load condition, or an available transmit power condition, or a UE thermal condition, or a combination thereof.

In some cases, the request signal includes a BSR indicating that a buffer of the UE has a predetermined amount of data for communicating with the base station. In some cases, the request signal includes a request to activate a second component carrier for the UE. In some cases, the request signal includes a scheduling request transmitted on a second component carrier, the second component carrier being different from a first component carrier associated with the default control channel monitoring set configured for the UE. In some cases, the request signal is transmitted in an UCI. In some cases, the request signal is transmitted in at least one of a MAC CE, or a PUCCH, or a combination thereof.

The timer manager 730 may initiate, based on the second signal, a timer for the at least one additional control channel monitoring set. In some examples, the timer manager 730 may stop the timer after a predetermined time period. In some examples, the timer manager 730 may stop the timer after a predetermined number of slots in which no control information is received in the at least one additional control channel monitoring set. In some examples, the timer manager 730 may restart the timer based on receiving the control information over the at least one additional control channel monitoring set. In some cases, the second signal activates a set of additional control channel monitoring sets, and a separate timer is initiated for each of the set of additional control channel monitoring sets.

The CC manager 735 may receive an activation signal activating a second component carrier for the UE, where the second signal includes the activation signal. In some examples, the CC manager 735 may receive a third signal indicating that a second component carrier has been deactivated for the UE. In some examples, the CC manager 735 may transmit a positive acknowledgement signal to the base station based at least in part on the second signal, the third signal, or a combination thereof.

The SCell Manager 740 may receive an activation signal activating a secondary cell to use for communications with the UE, where the second signal includes the activation signal.

The traffic condition manager 745 may receive a third signal indicating that a traffic condition satisfies a threshold, where the second signal includes the third signal.

The deactivation manager 750 may receive a third signal indicating that the at least one additional control channel monitoring set is deactivated for the UE, where a deactivation indication is received over a DCI in the default control channel monitoring set configured for the UE. In some examples, the deactivation manager 750 may refrain from monitoring the at least one additional control channel monitoring set based on the third signal.

The coreset manager 755 may monitor, in response to receiving the second signal, the default control channel monitoring set and the at least one additional control channel monitoring set, where the control information is received in response to the monitoring. In some cases, the control information received in the at least one additional control channel monitoring set includes a downlink grant for data in a corresponding data or shared data resource.

Figure 8:
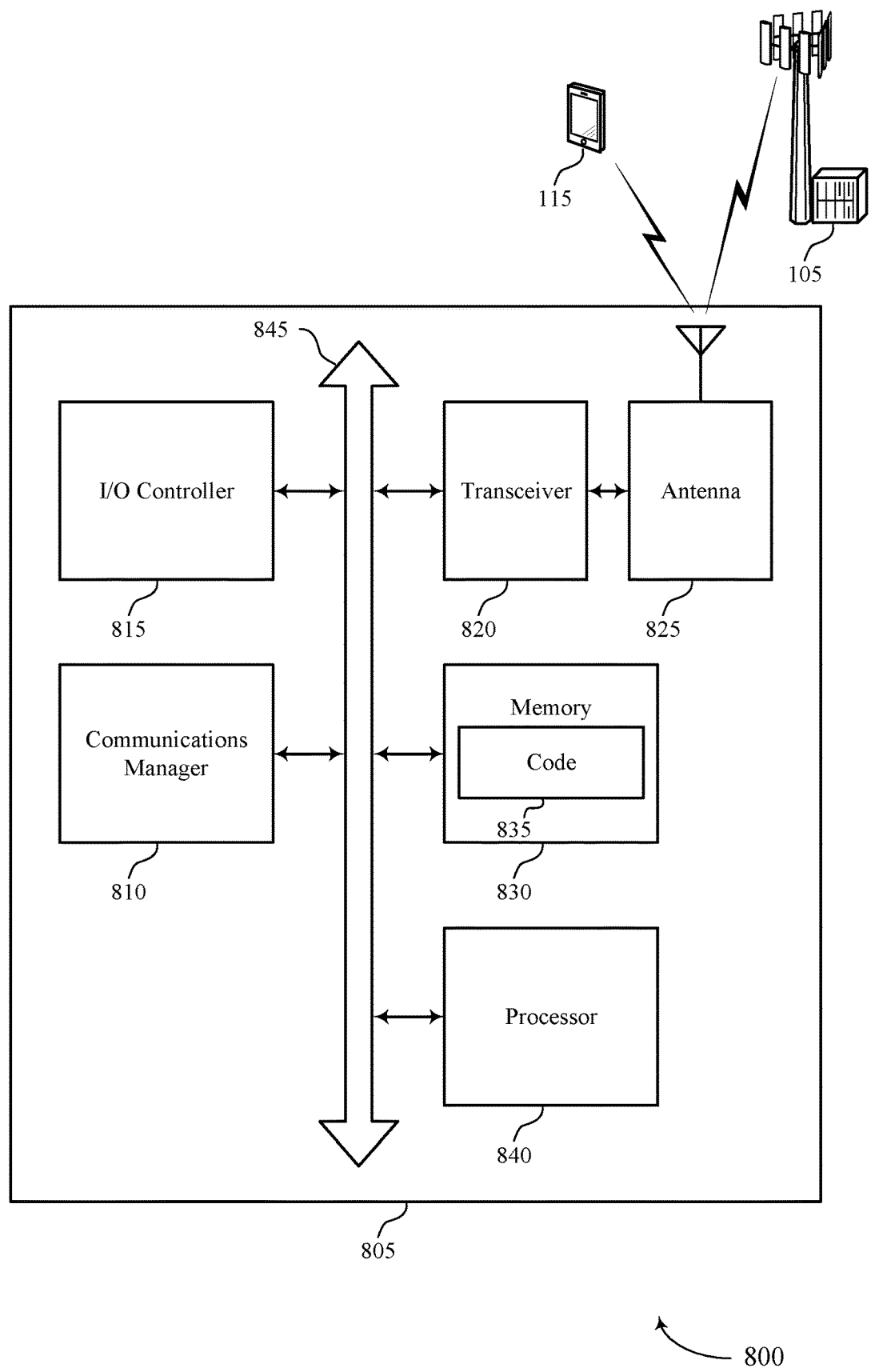
FIG. 8 shows a diagram of a system including a device that supports dynamic control channel management in accordance with aspects of the present disclosure.

FIG. 8 shows a diagram of a system 800 including a device 805 that supports dynamic control channel management in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may receive a first signal from a base station indicating a set of available control channel monitoring sets to be used for control information, receive, over a default control channel monitoring set of the available control channel monitoring sets configured for the UE, a second signal from the base station activating at least one additional control channel monitoring set from the set of available control channel monitoring sets, the default control channel monitoring set including a subset of the set of available control channel monitoring sets, and receive control information over the default control channel monitoring set and the at least one additional control channel monitoring set at least partially in response to receiving the second signal.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include RAM and ROM. The memory 830 may store computer-readable, computer-executable code 835 including instructions that, when executed, cause the processor to perform various functions described herein. In some cases, the memory 830 may contain, among other things, a BIOS which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting dynamic control channel management).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
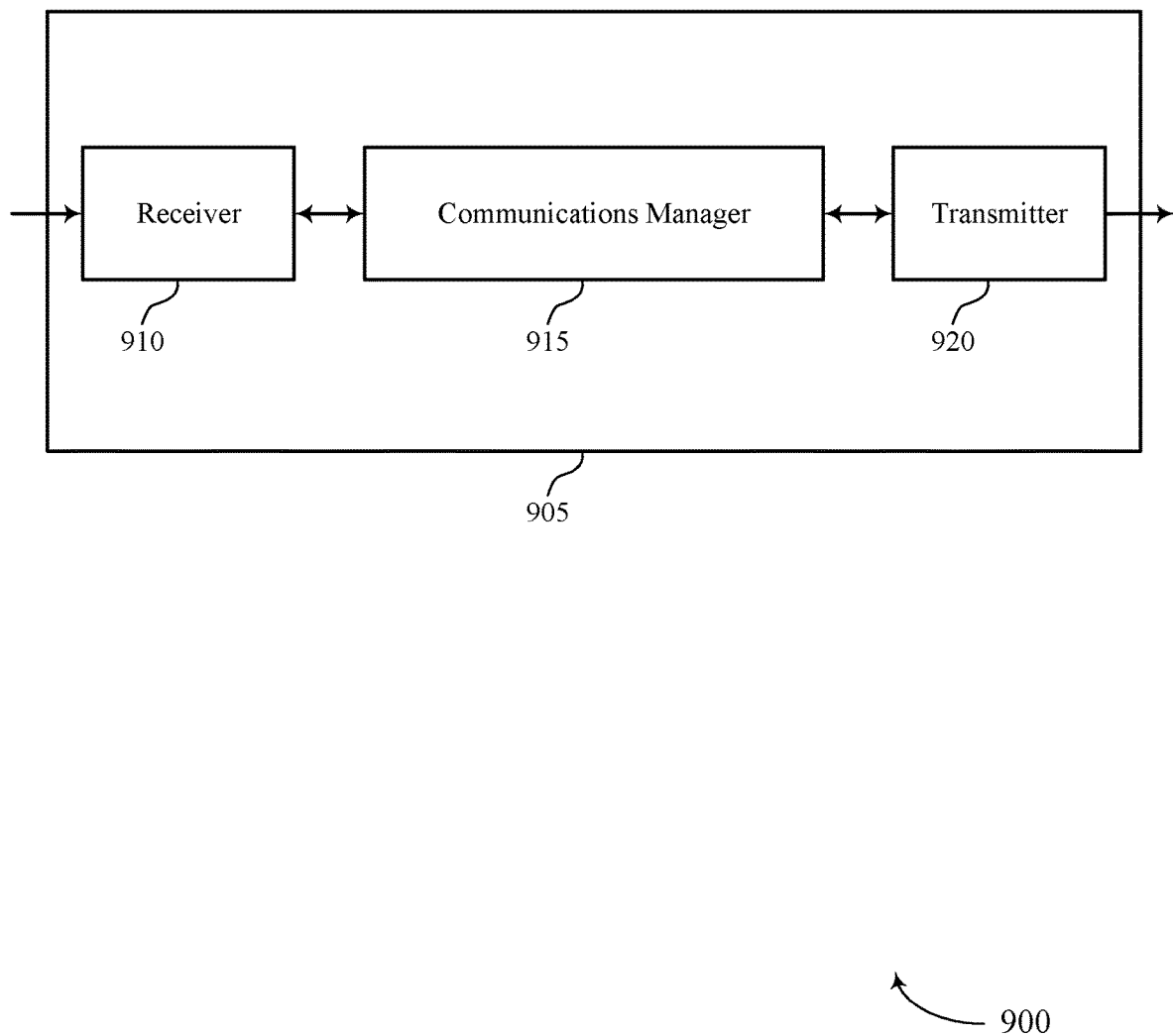
FIGS. 9 and 10 show block diagrams of devices that support dynamic control channel management in accordance with aspects of the present disclosure.

FIG. 9 shows a block diagram 900 of a device 905 that supports dynamic control channel management in accordance with aspects of the present disclosure. The device 905 may be an example of aspects of a base station 105 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to dynamic control channel management, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may transmit a first signal to a UE indicating a set of available control channel monitoring sets to be used for control information, transmit, over a default control channel monitoring set of the available control channel monitoring set configured for the UE, a second signal from the base station activating at least one additional control channel monitoring set from the set of available control channel monitoring sets, the default control channel monitoring set including a subset of the set of available control channel monitoring sets, and transmit control information over the default control channel monitoring set and the at least one additional control channel monitoring set at least partially in response to transmitting the second signal. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
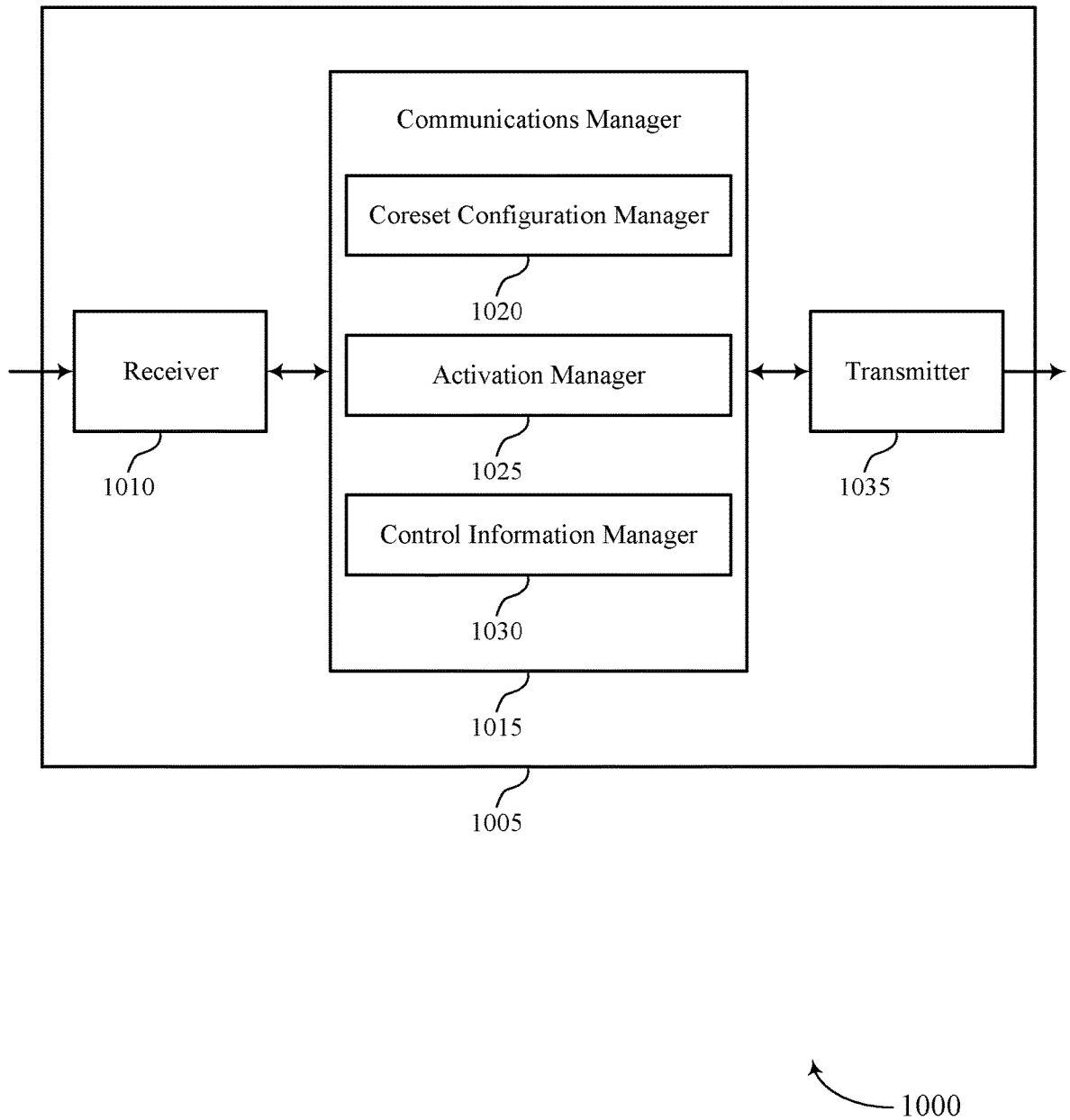

FIG. 10 shows a block diagram 1000 of a device 1005 that supports dynamic control channel management in accordance with aspects of the present disclosure. The device 1005 may be an example of aspects of a device 905 or a base station 105 as described herein. The device 1005 may include a receiver 1010, a communications manager 1015, and a transmitter 1035. The device 1005 may also include a processor. Each of these components may be in communication with one another (e.g., via one or more buses).

The receiver 1010 may receive information such as packets, user data, or control information associated with various information channels (e.g., control channels, data channels, and information related to dynamic control channel management, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a coreset configuration manager 1020, an activation manager 1025, and a control information manager 1030. The communications manager 1015 may be an example of aspects of the communications manager 1210 described herein.

The coreset configuration manager 1020 may transmit a first signal to a UE indicating a set of available control channel monitoring sets to be used for control information.

The activation manager 1025 may transmit, over a default control channel monitoring set of the available control channel monitoring set configured for the UE, a second signal from the base station activating at least one additional control channel monitoring set from the set of available control channel monitoring sets, the default control channel monitoring set including a subset of the set of available control channel monitoring sets.

The control information manager 1030 may transmit control information over the default control channel monitoring set and the at least one additional control channel monitoring set at least partially in response to transmitting the second signal.

The transmitter 1035 may transmit signals generated by other components of the device 1005. In some examples, the transmitter 1035 may be collocated with a receiver 1010 in a transceiver module. For example, the transmitter 1035 may be an example of aspects of the transceiver 1220 described with reference to FIG. 12. The transmitter 1035 may utilize a single antenna or a set of antennas.

Figure 11:
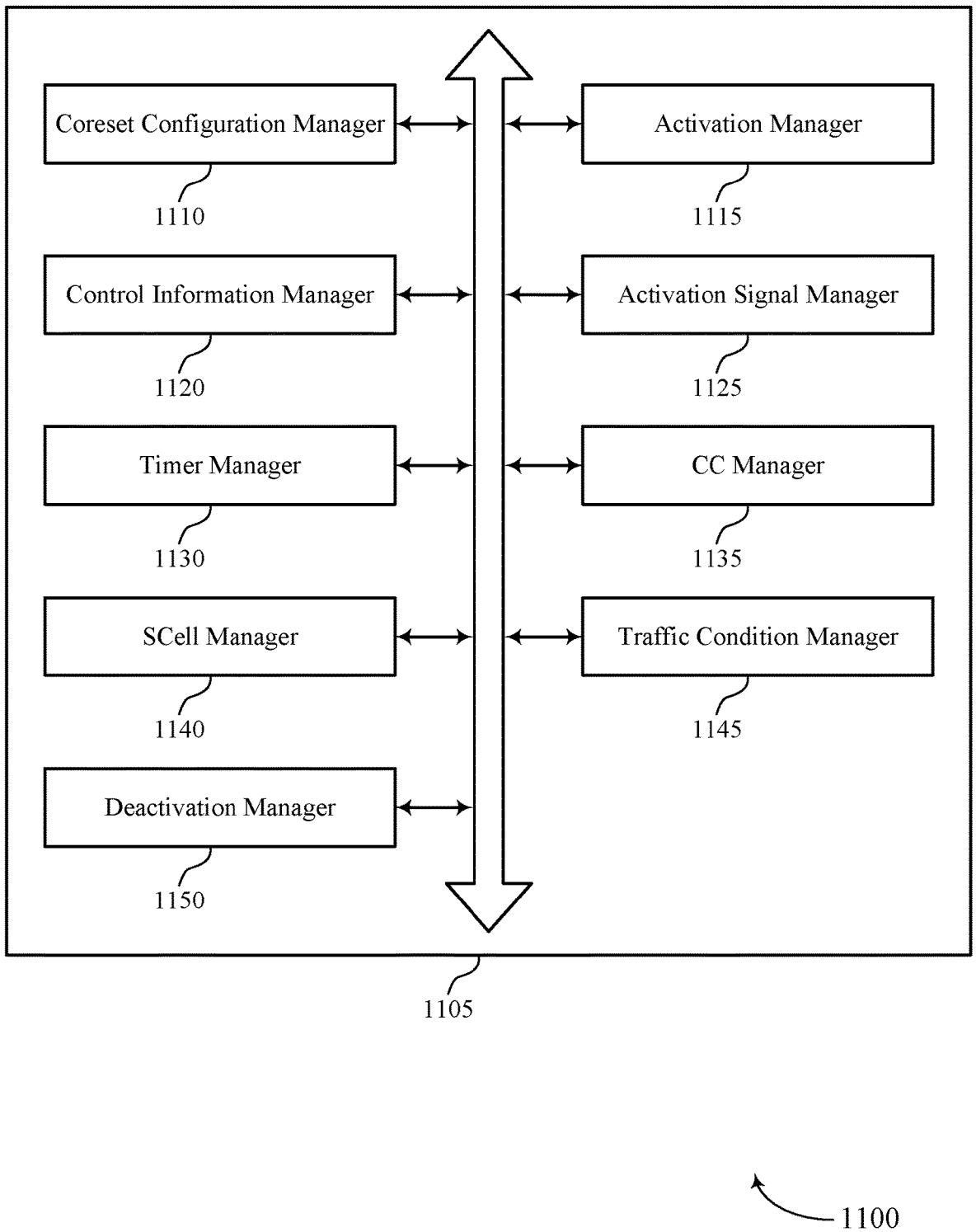
FIG. 11 shows a block diagram of a communications manager that supports dynamic control channel management in accordance with aspects of the present disclosure.

FIG. 11 shows a block diagram 1100 of a communications manager 1105 that supports dynamic control channel management in accordance with aspects of the present disclosure. The communications manager 1105 may be an example of aspects of a communications manager 915, a communications manager 1015, or a communications manager 1210 described herein. The communications manager 1105 may include a coreset configuration manager 1110, an activation manager 1115, a control information manager 1120, an activation signal manager 1125, a timer manager 1130, a CC manager 1135, a SCell manager 1140, a traffic condition manager 1145, and a deactivation manager 1150. Each of these modules may communicate, directly or indirectly, with one another (e.g., via one or more buses).

The coreset configuration manager 1110 may transmit a first signal to a UE indicating a set of available control channel monitoring sets to be used for control information.

The activation manager 1115 may transmit, over a default control channel monitoring set of the available control channel monitoring set configured for the UE, a second signal from the base station activating at least one additional control channel monitoring set from the set of available control channel monitoring sets, the default control channel monitoring set including a subset of the set of available control channel monitoring sets.

The control information manager 1120 may transmit control information over the default control channel monitoring set and the at least one additional control channel monitoring set at least partially in response to transmitting the second signal.

The activation signal manager 1125 may receive a request signal from the UE for activation of the at least one additional control channel monitoring set, where the second signal is transmitted based on the request signal. In some examples, receiving a predetermined number of NACK signals from the UE, where the request signal includes the predetermined number of NACK signals.

In some examples, the activation signal manager 1125 may determine that a traffic condition associated with communications with the UE has satisfied a threshold, where the request signal is received in response to the traffic condition satisfying the threshold. In some cases, the traffic condition includes at least one of a predetermined amount of data for communicating with the UE, or a traffic load condition, or a combination thereof. In some cases, the request signal includes a BSR indicating that a buffer of the UE has a predetermined amount of data for communicating with the base station. In some cases, the request signal includes a request to activate a second component carrier for the UE. In some cases, the request signal includes a scheduling request transmitted on a second component carrier, the second component carrier being different from a first component carrier associated with the default control channel monitoring set configured for the UE. In some cases, the request signal is received in an UCI. In some cases, the request signal is received in at least one of a MAC CE, or a PUCCH, or a combination thereof.

The timer manager 1130 may initiate, based on the second signal, a timer for the at least one additional control channel monitoring set. In some examples, the timer manager 1130 may stop the timer after a predetermined time period. In some examples, the timer manager 1130 may stop the timer after a predetermined number of slots in which no control information is transmitted in the at least one additional control channel monitoring set. In some examples, the timer manager 1130 may restart the timer based on transmitting the control information over the at least one additional control channel monitoring set. In some cases, the second signal activates a set of additional control channel monitoring sets, and a separate timer is initiated for each of the set of additional control channel monitoring sets.

The CC manager 1135 may transmit an activation signal activating a second component carrier for the UE, where the second signal includes the activation signal.

The SCell Manager 1140 may transmit an activation signal activating a secondary cell to use for communications with the UE, where the second signal includes the activation signal.

The traffic condition manager 1145 may transmit a third signal indicating that a traffic condition satisfies a threshold, where the second signal includes the third signal.

The deactivation manager 1150 may transmit a third signal indicating that the at least one additional control channel monitoring set is deactivated for the UE, where a deactivation indication is transmitted over a DCI in the default control channel monitoring set configured for the UE. In some examples, the deactivation manager 1150 may transmit a third signal indicating that a second component carrier has been deactivated for the UE.

Figure 12:
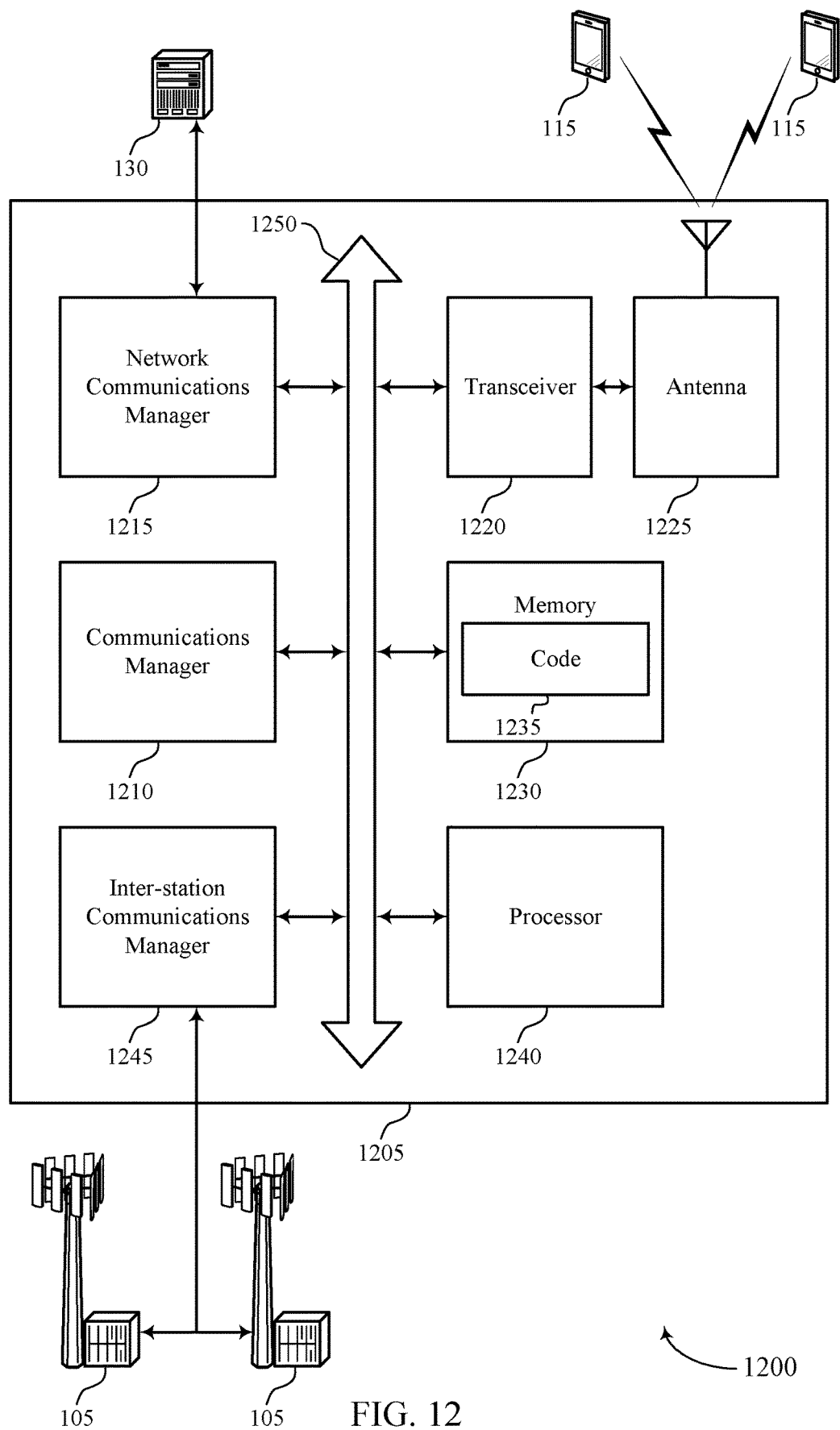
FIG. 12 shows a diagram of a system including a device that supports dynamic control channel management in accordance with aspects of the present disclosure.

FIG. 12 shows a diagram of a system 1200 including a device 1205 that supports dynamic control channel management in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communications manager 1210 may transmit a first signal to a UE indicating a set of available control channel monitoring sets to be used for control information, transmit, over a default control channel monitoring set of the available control channel monitoring set configured for the UE, a second signal from the base station activating at least one additional control channel monitoring set from the set of available control channel monitoring sets, the default control channel monitoring set including a subset of the set of available control channel monitoring sets, and transmit control information over the default control channel monitoring set and the at least one additional control channel monitoring set at least partially in response to transmitting the second signal.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device #{device} to perform various functions (e.g., functions or tasks supporting dynamic control channel management).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
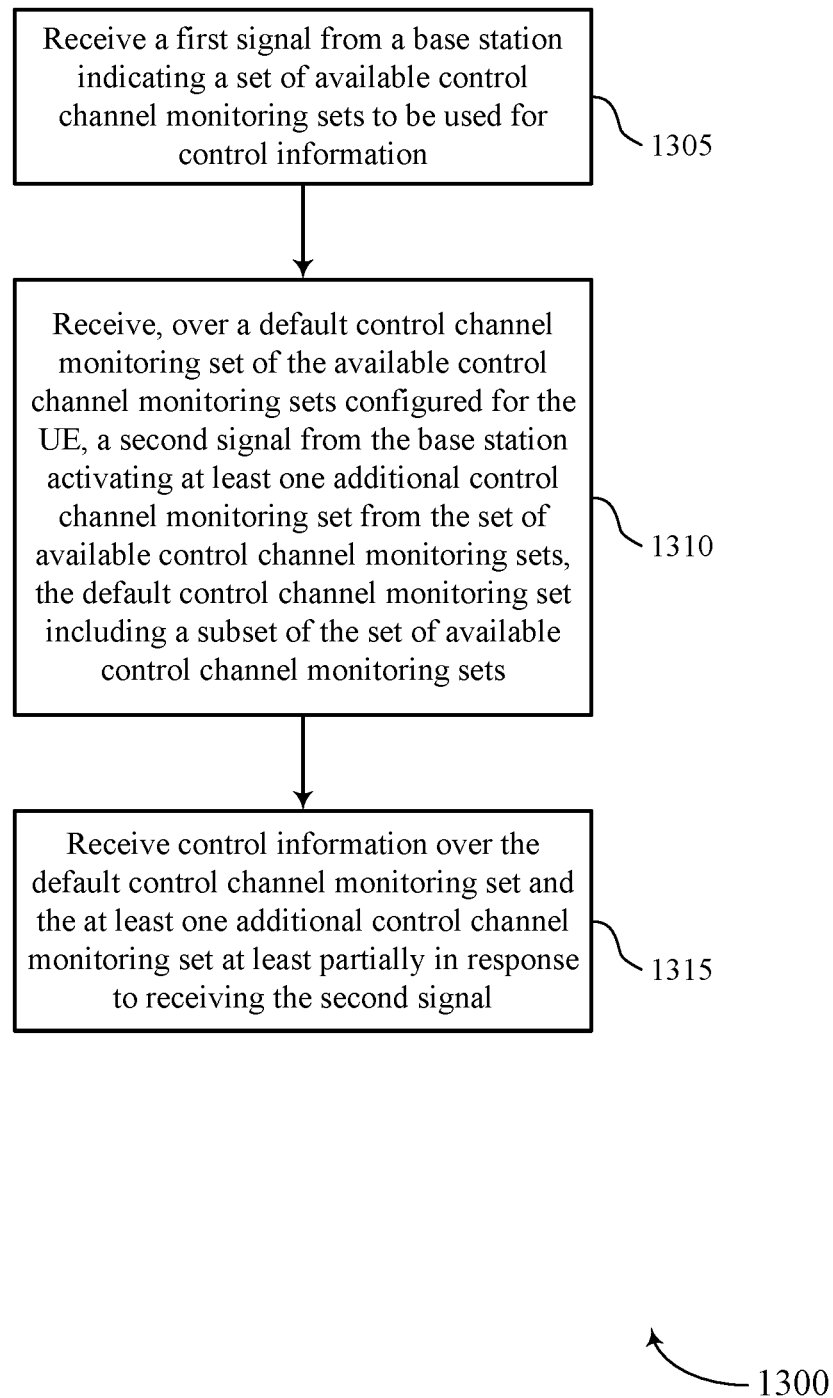
FIGS. 13 through 16 show flowcharts illustrating methods that support dynamic control channel management in accordance with aspects of the present disclosure.

FIG. 13 shows a flowchart illustrating a method 1300 that supports dynamic control channel management in accordance with aspects of the present disclosure. The operations of method 1300 may be implemented by a UE 115 or its components as described herein. For example, the operations of method 1300 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1305, the UE may receive a first signal from a base station indicating a set of available control channel monitoring sets to be used for control information. The operations of 1305 may be performed according to the methods described herein. In some examples, aspects of the operations of 1305 may be performed by a coreset configuration manager as described with reference to FIGS. 5 through 8.

At 1310, the UE may receive, over a default control channel monitoring set of the available control channel monitoring sets configured for the UE, a second signal from the base station activating at least one additional control channel monitoring set from the set of available control channel monitoring sets, the default control channel monitoring set including a subset of the set of available control channel monitoring sets. The operations of 1310 may be performed according to the methods described herein. In some examples, aspects of the operations of 1310 may be performed by an activation manager as described with reference to FIGS. 5 through 8.

At 1315, the UE may receive control information over the default control channel monitoring set and the at least one additional control channel monitoring set at least partially in response to receiving the second signal. The operations of 1315 may be performed according to the methods described herein. In some examples, aspects of the operations of 1315 may be performed by a control information manager as described with reference to FIGS. 5 through 8.

Figure 14:
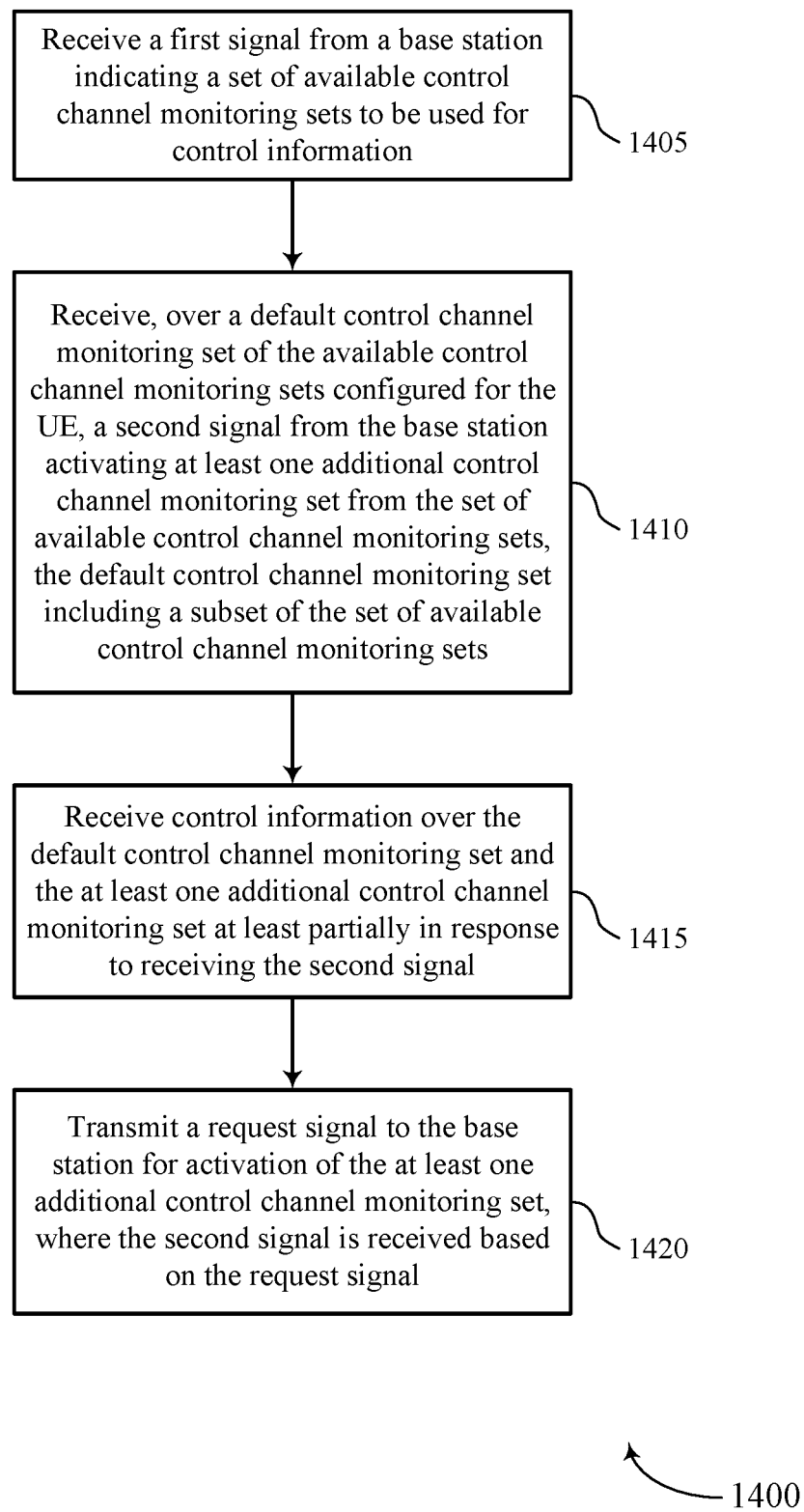

FIG. 14 shows a flowchart illustrating a method 1400 that supports dynamic control channel management in accordance with aspects of the present disclosure. The operations of method 1400 may be implemented by a UE 115 or its components as described herein. For example, the operations of method 1400 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1405, the UE may receive a first signal from a base station indicating a set of available control channel monitoring sets to be used for control information. The operations of 1405 may be performed according to the methods described herein. In some examples, aspects of the operations of 1405 may be performed by a coreset configuration manager as described with reference to FIGS. 5 through 8.

At 1410, the UE may receive, over a default control channel monitoring set of the available control channel monitoring sets configured for the UE, a second signal from the base station activating at least one additional control channel monitoring set from the set of available control channel monitoring sets, the default control channel monitoring set including a subset of the set of available control channel monitoring sets. The operations of 1410 may be performed according to the methods described herein. In some examples, aspects of the operations of 1410 may be performed by an activation manager as described with reference to FIGS. 5 through 8.

At 1415, the UE may receive control information over the default control channel monitoring set and the at least one additional control channel monitoring set at least partially in response to receiving the second signal. The operations of 1415 may be performed according to the methods described herein. In some examples, aspects of the operations of 1415 may be performed by a control information manager as described with reference to FIGS. 5 through 8.

At 1420, the UE may transmit a request signal to the base station for activation of the at least one additional control channel monitoring set, where the second signal is received based on the request signal. The operations of 1420 may be performed according to the methods described herein. In some examples, aspects of the operations of 1420 may be performed by an activation signal manager as described with reference to FIGS. 5 through 8.

Figure 15:
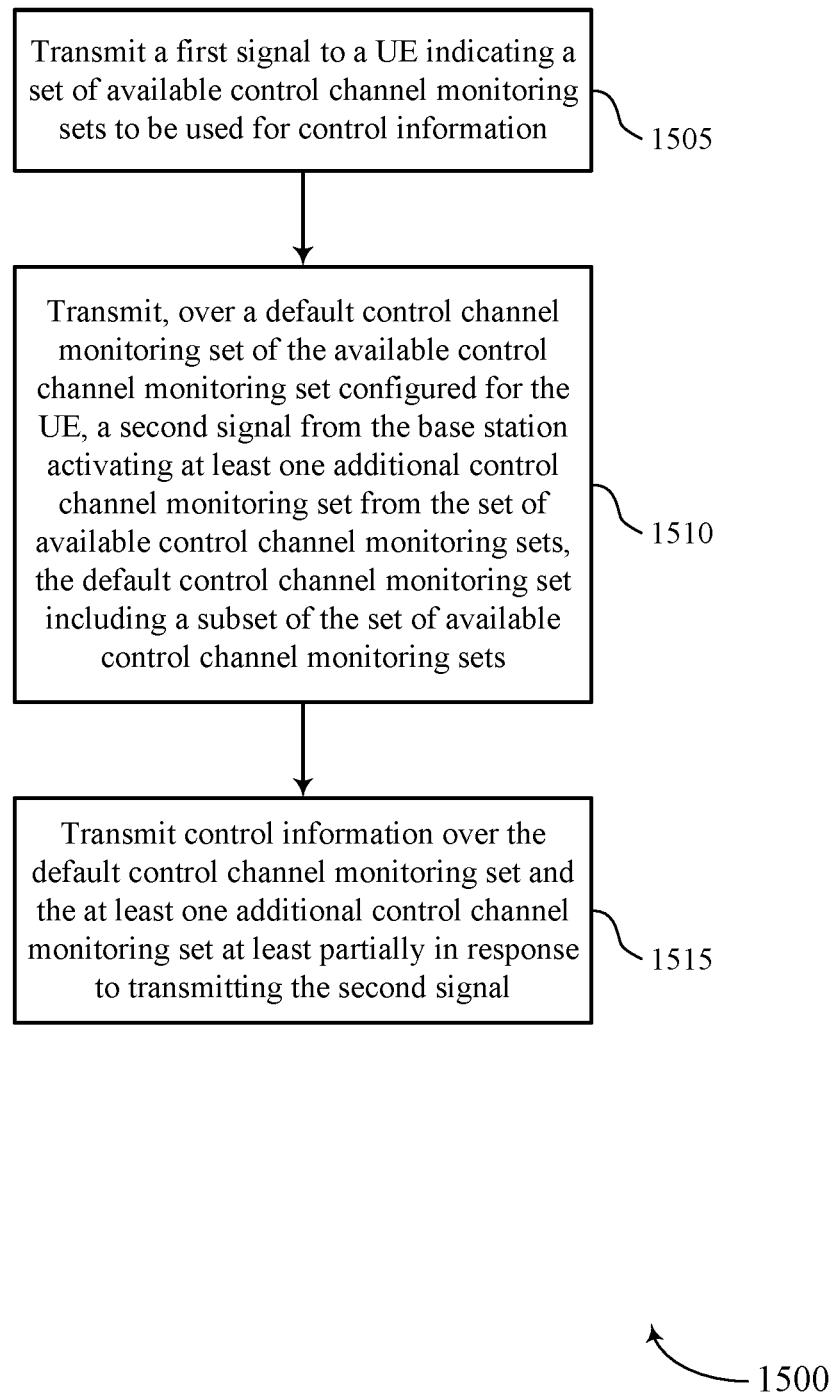

FIG. 15 shows a flowchart illustrating a method 1500 that supports dynamic control channel management in accordance with aspects of the present disclosure. The operations of method 1500 may be implemented by a base station 105 or its components as described herein. For example, the operations of method 1500 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1505, the base station may transmit a first signal to a UE indicating a set of available control channel monitoring sets to be used for control information. The operations of 1505 may be performed according to the methods described herein. In some examples, aspects of the operations of 1505 may be performed by a coreset configuration manager as described with reference to FIGS. 9 through 12.

At 1510, the base station may transmit, over a default control channel monitoring set of the available control channel monitoring set configured for the UE, a second signal from the base station activating at least one additional control channel monitoring set from the set of available control channel monitoring sets, the default control channel monitoring set including a subset of the set of available control channel monitoring sets. The operations of 1510 may be performed according to the methods described herein. In some examples, aspects of the operations of 1510 may be performed by an activation manager as described with reference to FIGS. 9 through 12.

At 1515, the base station may transmit control information over the default control channel monitoring set and the at least one additional control channel monitoring set at least partially in response to transmitting the second signal. The operations of 1515 may be performed according to the methods described herein. In some examples, aspects of the operations of 1515 may be performed by a control information manager as described with reference to FIGS. 9 through 12.

Figure 16:
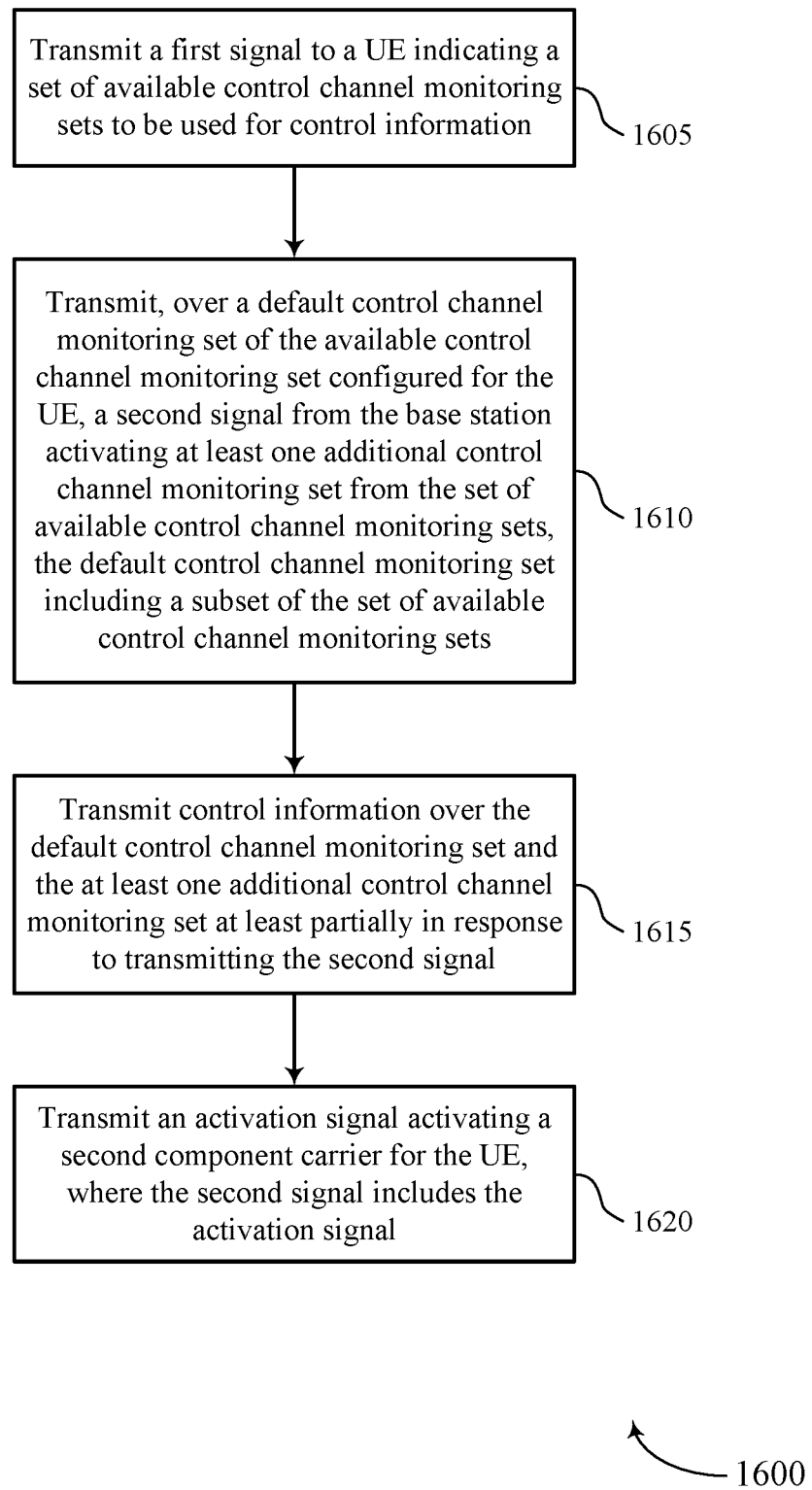

FIG. 16 shows a flowchart illustrating a method 1600 that supports dynamic control channel management in accordance with aspects of the present disclosure. The operations of method 1600 may be implemented by a base station 105 or its components as described herein. For example, the operations of method 1600 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1605, the base station may transmit a first signal to a UE indicating a set of available control channel monitoring sets to be used for control information. The operations of 1605 may be performed according to the methods described herein. In some examples, aspects of the operations of 1605 may be performed by a coreset configuration manager as described with reference to FIGS. 9 through 12.

At 1610, the base station may transmit, over a default control channel monitoring set of the available control channel monitoring set configured for the UE, a second signal from the base station activating at least one additional control channel monitoring set from the set of available control channel monitoring sets, the default control channel monitoring set including a subset of the set of available control channel monitoring sets. The operations of 1610 may be performed according to the methods described herein. In some examples, aspects of the operations of 1610 may be performed by an activation manager as described with reference to FIGS. 9 through 12.

At 1615, the base station may transmit control information over the default control channel monitoring set and the at least one additional control channel monitoring set at least partially in response to transmitting the second signal. The operations of 1615 may be performed according to the methods described herein. In some examples, aspects of the operations of 1615 may be performed by a control information manager as described with reference to FIGS. 9 through 12.

At 1620, the base station may transmit an activation signal activating a second component carrier for the UE, where the second signal includes the activation signal. The operations of 1620 may be performed according to the methods described herein. In some examples, aspects of the operations of 1620 may be performed by a CC manager as described with reference to FIGS. 9 through 12.

It should be noted that the methods described above describe possible implementations, and that the operations and the steps may be rearranged or otherwise modified and that other implementations are possible. Further, aspects from two or more of the methods may be combined.

Thus, example 1 is a method for wireless communication at a UE that includes: receiving a first signal from a base station indicating a set of available control channel monitoring sets to be used for control information; receiving, over a default control channel monitoring set of the available control channel monitoring sets configured for the UE, a second signal from the base station activating at least one additional control channel monitoring set from the set of available control channel monitoring sets, the default control channel monitoring set comprising a subset of the set of available control channel monitoring sets; and receiving control information over the default control channel monitoring set and the at least one additional control channel monitoring set at least partially in response to receiving the second signal.

In example 2, the method of example 1 may include transmitting a request signal to the base station for activation of the at least one additional control channel monitoring set, wherein the second signal is received based at least in part on the request signal.

In example 3, the method of any of examples 1-2 may include transmitting a predetermined number of NACK signals to the base station, wherein the request signal comprises the predetermined number of NACK signals.

In example 4, the method of any of examples 1-3 may include determining that a traffic condition associated with communications with the base station has satisfied a threshold, wherein the request signal is transmitted in response to the traffic condition satisfying the threshold.

In example 5, the method of any of examples 1-4 may include the traffic condition being at least one of a predetermined amount of data for communicating with the base station, or a traffic load condition, or an available transmit power condition, or a UE thermal condition, or a combination thereof.

In example 6, the method of any of examples 1-5 may include the request signal being a BSR indicating that a buffer of the UE has a predetermined amount of data for communicating with the base station.

In example 7, the method of any of examples 1-6 may include the request signal being a request to activate a second component carrier for the UE.

In example 8, the method of any of examples 1-7 may include the request signal being a scheduling request transmitted on a second component carrier, the second component carrier being different from a first component carrier associated with the default control channel monitoring set configured for the UE.

In example 9, the method of any of examples 1-8 may include the request signal being transmitted in an UCI.

In example 10, the method of any of examples 1-9 may include the request signal is transmitted in at least one of a MAC CE, or a PUCCH, or a combination thereof.

In example 11, the method of any of examples 1-10 may include initiating, based at least in part on the second signal, a timer for the at least one additional control channel monitoring set.

In example 12, the method of any of examples 1-11 may include stopping the timer after a predetermined time period.

In example 13, the method of any of examples 1-12 may include stopping the timer after a predetermined number of slots in which no control information is received in the at least one additional control channel monitoring set.

In example 14, the method of any of examples 1-13 may include restarting the timer based at least in part on receiving the control information over the at least one additional control channel monitoring set.

In example 15, the method of any of examples 1-14 may include the second signal activating a plurality of additional control channel monitoring sets, and a separate timer is initiated for each of the plurality of additional control channel monitoring sets.

In example 16, the method of any of examples 1-15 may include receiving an activation signal activating a second component carrier for the UE, wherein the second signal comprises the activation signal.

In example 17, the method of any of examples 1-16 may include receiving an activation signal activating a secondary cell to use for communications with the UE, wherein the second signal comprises the activation signal.

In example 18, the method of any of examples 1-17 may include receiving a third signal indicating that a traffic condition satisfies a threshold, wherein the second signal comprises the third signal.

In example 19, the method of any of examples 1-18 may include receiving a third signal indicating that the at least one additional control channel monitoring set is deactivated for the UE, wherein a deactivation indication is received over a DCI in the default control channel monitoring set configured for the UE; and refraining from monitoring the at least one additional control channel monitoring set based at least in part on the third signal.

In example 20, the method of any of examples 1-19 may include receiving a third signal indicating that a second component carrier has been deactivated for the UE.

In example 21, the method of any of examples 1-20 may include the second signal being received over a DCI, the DCI indicating an index for the at least one additional control channel monitoring set.

In example 22, the method of any of examples 1-21 may include the second signal being received over at least one of a MAC CE, or a PDCCH, or a combination thereof.

In example 23, the method of any of examples 1-22 may include the at least one additional control channel monitoring set being associated with a primary component carrier, or a secondary component carrier, or a combination thereof.

In example 24, the method of any of examples 1-23 may include monitoring, in response to receiving the second signal, the default control channel monitoring set and the at least one additional control channel monitoring set, wherein the control information is received in response to the monitoring.

In example 25, the method of any of examples 1-24 may include the control information received in the at least one additional control channel monitoring set being a downlink grant for data in a corresponding data or shared data resource.

Example 26 is a system or apparatus including means for implementing a method or realizing an apparatus as in any of examples 1-25.

Example 27 is a non-transitory computer-readable medium storing instructions executable by one or more processors to cause the one or more processors to implement a method as in any of examples 1-25.

Example 28 is a system including one or more processors and memory in electronic communication with the one or more processors storing instructions executable by the one or more processors to cause the system or apparatus to implement a method as in any of examples 1-25.

Example 29 is a method for wireless communication at a base station that includes: transmitting a first signal to a UE indicating a set of available control channel monitoring sets to be used for control information; transmitting, over a default control channel monitoring set of the available control channel monitoring set configured for the UE, a second signal from the base station activating at least one additional control channel monitoring set from the set of available control channel monitoring sets, the default control channel monitoring set comprising a subset of the set of available control channel monitoring sets; and transmitting control information over the default control channel monitoring set and the at least one additional control channel monitoring set at least partially in response to transmitting the second signal.

In example 30, the method of example 29 may include receiving a request signal from the UE for activation of the at least one additional control channel monitoring set, wherein the second signal is transmitted based at least in part on the request signal.

In example 31, the method of any of examples 29-30 may include receiving a predetermined number of NACK signals from the UE, wherein the request signal comprises the predetermined number of NACK signals.

In example 32, the method of any of examples 29-31 may include determining that a traffic condition associated with communications with the UE has satisfied a threshold, wherein the request signal is received in response to the traffic condition satisfying the threshold.

In example 33, the method of any of examples 29-32 may include the traffic condition being at least one of a predetermined amount of data for communicating with the UE, or a traffic load condition, or a combination thereof.

In example 34, the method of any of examples 29-33 may include the request signal being a BSR indicating that a buffer of the UE has a predetermined amount of data for communicating with the base station.

In example 35, the method of any of examples 29-34 may include the request signal being a request to activate a second component carrier for the UE.

In example 36, the method of any of examples 29-35 may include the request signal being a scheduling request transmitted on a second component carrier, the second component carrier being different from a first component carrier associated with the default control channel monitoring set configured for the UE.

In example 37, the method of any of examples 29-36 may include the request signal being received in an UCI.

In example 38, the method of any of examples 29-37 may include the request signal being received in at least one of a MAC CE, or a PUCCH, or a combination thereof.

In example 39, the method of any of examples 29-38 may include initiating, based at least in part on the second signal, a timer for the at least one additional control channel monitoring set.

In example 40, the method of any of examples 29-39 may include stopping the timer after a predetermined time period.

In example 41, the method of any of examples 29-40 may include stopping the timer after a predetermined number of slots in which no control information is transmitted in the at least one additional control channel monitoring set.

In example 42, the method of any of examples 29-41 may include restarting the timer based at least in part on transmitting the control information over the at least one additional control channel monitoring set.

In example 43, the method of any of examples 29-42 may include the second signal activating a plurality of additional control channel monitoring sets, and a separate timer is initiated for each of the plurality of additional control channel monitoring sets.

In example 44, the method of any of examples 29-43 may include transmitting an activation signal activating a second component carrier for the UE, wherein the second signal comprises the activation signal.

In example 45, the method of any of examples 29-44 may include transmitting an activation signal activating a secondary cell to use for communications with the UE, wherein the second signal comprises the activation signal.

In example 46, the method of any of examples 29-45 may include transmitting a third signal indicating that a traffic condition satisfies a threshold, wherein the second signal comprises the third signal.

In example 47, the method of any of examples 29-46 may include transmitting a third signal indicating that the at least one additional control channel monitoring set is deactivated for the UE, wherein a deactivation indication is transmitted over a DCI in the default control channel monitoring set configured for the UE.

In example 48, the method of any of examples 29-47 may include transmitting a third signal indicating that a second component carrier has been deactivated for the UE.

Example 49 is a system or apparatus including means for implementing a method or realizing an apparatus as in any of examples 29-48.

Example 50 is a non-transitory computer-readable medium storing instructions executable by one or more processors to cause the one or more processors to implement a method as in any of examples 29-48.

Example 51 is a system including one or more processors and memory in electronic communication with the one or more processors storing instructions executable by the one or more processors to cause the system or apparatus to implement a method as in any of examples 29-48.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   receiving a first signal from a network device configuring a set of available control channel monitoring sets to be used for control information and a first subset of the set of available control channel monitoring sets;
   receiving, over the first subset of the set of available control channel monitoring sets, a second signal from the network device comprising an indication activating a second subset of the set of available control channel monitoring sets different from the first subset, the second subset comprising at least one additional control channel monitoring set from the set of available control channel monitoring sets configured for the UE by the first signal;

initiating, based at least in part on the second signal, a timer for the at least one additional control channel monitoring set;

receiving the control information over the second subset at least partially in response to receiving the second signal, wherein a third subset of the set of available control channel monitoring sets configured for the UE by the first signal, different from the first subset and the second subset, is inactive during reception of the control information; and stopping the timer after a predetermined number of slots in which no control information is received in the at least one additional control channel monitoring set, wherein the at least one additional control channel monitoring set is deactivated based at least in part on stopping the timer.

2. The method of claim 1, further comprising:
transmitting, to the network device, a request to activate the second subset of the set of available control channel monitoring sets, wherein activation of the second subset is based at least in part on transmitting the request via a component carrier associated with the at least one additional control channel monitoring set.

3. The method of claim 2, further comprising:
transmitting a predetermined number of negative acknowledgement (NACK) signals to the network device, wherein the request comprises the predetermined number of NACK signals.

4. The method of claim 2, wherein the request is transmitted in at least one of a medium access control (MAC) control element (CE), or a physical uplink control channel (PUCCH), or an uplink control information (UCI), or a combination thereof.

5. The method of claim 1, further comprising:
stopping the timer after a predetermined time period.

6. The method of claim 1, further comprising:
restarting the timer based at least in part on receiving the control information over the at least one additional control channel monitoring set.

7. The method of claim 1, wherein the second signal activates a plurality of additional control channel monitoring sets, and a separate timer is initiated for each of the plurality of additional control channel monitoring sets.

8. The method of claim 1, further comprising:
receiving an activation signal activating at least one of a second component carrier for the UE, or activating a secondary cell to use for communications with the UE, or a combination thereof, wherein the second signal comprises the activation signal.

9. The method of claim 1, further comprising:
receiving a third signal indicating that a traffic condition satisfies a threshold, wherein the second signal comprises the third signal.

10. The method of claim 1, further comprising:
receiving a third signal indicating that the at least one additional control channel monitoring set is deactivated for the UE, wherein a deactivation indication is received over a downlink control information (DCI) in the first subset of the set of available control channel monitoring sets configured for the UE; and refraining from monitoring the at least one additional control channel monitoring set based at least in part on the third signal.

11. The method of claim 1, further comprising:
receiving a third signal indicating that a second component carrier has been deactivated for the UE.

12. The method of claim 1, wherein the second signal is received over a downlink control information (DCI) indicating an index for the at least one additional control channel monitoring set.

13. The method of claim 1, wherein the at least one additional control channel monitoring set is associated with a primary component carrier, or a secondary component carrier, or a combination thereof.

14. The method of claim 1, further comprising:
monitoring, in response to receiving the second signal, the second subset, wherein the control information is received in response to the monitoring.

15. The method of claim 1, wherein the control information received in the at least one additional control channel monitoring set comprises a downlink grant for data in a corresponding data or shared data resource.

16. The method of claim 1, further comprising:
transmitting a positive acknowledgement signal to the network device based at least in part on the second signal.

17. The method of claim 5, further comprising:
restarting the timer based at least in part on receiving the control information over the at least one additional control channel monitoring set.

18. The method of claim 2, further comprising:
determining that a traffic condition associated with communications with the network device has satisfied a threshold, wherein the traffic condition comprises at least one of a predetermined amount of data for communicating with the network device, or a traffic load condition, or an available transmit power condition, or a UE thermal condition, or a combination thereof, and wherein the request is transmitted in response to the traffic condition satisfying the threshold.

19. A method for wireless communication at a network device, comprising:
transmitting a first signal to a user equipment (UE) configuring a set of available control channel monitoring sets to be used for control information and a first subset of the set of available control channel monitoring sets;

transmitting, over the first subset of the set of available control channel monitoring sets, a second signal from the network device comprising an indication activating a second subset of the set of available control channel monitoring sets different from the first subset, the second subset comprising at least one additional control channel monitoring set from the set of available control channel monitoring sets configured for the UE by the first signal;

initiating, based at least in part on the second signal, a timer for the at least one additional control channel monitoring set;

transmitting the control information over the second subset at least partially in response to transmitting the second signal, wherein a third subset of the set of available control channel monitoring sets configured for the UE by the first signal, different from the first subset and the second subset, is inactive during reception of the control information; and stopping the timer after a predetermined number of slots in which no control information is received in the at least one additional control channel monitoring set, wherein the at least one additional control channel monitoring set is deactivated based at least in part on stopping the timer.

20. The method of claim 19, further comprising:
receiving, from the UE, a request to activate the second subset of the set of available control channel monitoring sets, wherein activation of the second subset is based at least in part on transmitting the request via a component carrier associated with the at least one additional control channel monitoring set.

21. The method of claim 20, further comprising:
receiving a predetermined number of negative acknowledgement (NACK) signals from the UE, wherein the request comprises the predetermined number of NACK signals.

22. The method of claim 20, further comprising:
determining that a traffic condition associated with communications with the UE has satisfied a threshold, wherein the traffic condition comprises at least one of a predetermined amount of data for communicating with the network device, or a traffic load condition, or an available transmit power condition, or a UE thermal condition, or a combination thereof, and wherein the request is received in response to the traffic condition satisfying the threshold.

23. An apparatus for wireless communication at a user equipment (UE), comprising:
one or more memories storing processor-executable code; and
one or more processors coupled with the one or more memories and operable to execute the code to cause the apparatus to:
receive a first signal from a network device configuring a set of available control channel monitoring sets to be used for control information and a first subset of the set of available control channel monitoring sets;
receive, over the first subset of the set of available control channel monitoring sets, a second signal from the network device comprising an indication activating a second subset of the set of available control channel monitoring sets different from the first subset, the second subset comprising at least one additional control channel monitoring set from the set of available control channel monitoring sets configured for the UE by the first signal;
initiate, based at least in part on the second signal, a timer for the at least one additional control channel monitoring set;
receive the control information over the second subset at least partially in response to receiving the second signal, wherein a third subset of the set of available control channel monitoring sets configured for the UE by the first signal, different from the first subset and the second subset, is inactive during reception of the control information; and
stop the timer after a predetermined number of slots in which no control information is received in the at least one additional control channel monitoring set, wherein the at least one additional control channel monitoring set is deactivated based at least in part on stopping the timer.

24. The apparatus of claim 23, wherein the one or more processors are further operable to execute the code to cause the apparatus to:
restart the timer based at least in part on reception of the control information over the at least one additional control channel monitoring set.

25. The apparatus of claim 23, wherein the second signal is received over a downlink control information (DCI) indicating an index for the at least one additional control channel monitoring set.

26. An apparatus for wireless communication at a network device, comprising:
one or more memories storing processor-executable code; and
one or more processors coupled with the one or more memories and operable to execute the code to cause the apparatus to:
transmit a first signal to a user equipment (UE) configuring a set of available control channel monitoring sets to be used for control information and a first subset of the set of available control channel monitoring sets;
transmit, over the first subset of the set of available control channel monitoring sets, a second signal from the network device comprising an indication activating a second subset of the set of available control channel monitoring sets different from the first subset, the second subset comprising at least one additional control channel monitoring set from the set of available control channel monitoring sets configured for the UE by the first signal;
initiate, based at least in part on the second signal, a timer for the at least one additional control channel monitoring set;
transmit the control information over the second subset at least partially in response to transmitting the second signal, wherein a third subset of the set of available control channel monitoring sets configured for the UE by the first signal, different from the first subset and the second subset, is inactive during reception of the control information; and
stop the timer after a predetermined number of slots in which no control information is received in the at least one additional control channel monitoring set, wherein the at least one additional control channel monitoring set is deactivated based at least in part on stopping the timer.

* * * * *